(12) United States Patent
Svedberg et al.

(10) Patent No.: US 9,206,618 B2
(45) Date of Patent: Dec. 8, 2015

(54) EDGE PROTECTION SYSTEM USING CANTILEVERED COUNTERWEIGHT

(71) Applicant: Honeywell International Inc., Morristown, NJ (US)

(72) Inventors: Joakim Svedberg, Froson (SE); Patrick Holmbom, As (SE); Roger Golaub, Northampton (GB)

(73) Assignee: Honeywell International Inc., Morristown, NJ (US)

( * ) Notice: Subject to any disclaimer, the term of this patent is extended or adjusted under 35 U.S.C. 154(b) by 13 days.

(21) Appl. No.: 13/833,504

(22) Filed: Mar. 15, 2013

(65) Prior Publication Data

US 2013/0240816 A1 Sep. 19, 2013

Related U.S. Application Data

(60) Provisional application No. 61/612,056, filed on Mar. 16, 2012.

(51) Int. Cl.
*E04H 17/14* (2006.01)
*E04G 21/32* (2006.01)
(Continued)

(52) U.S. Cl.
CPC ........ *E04H 17/14* (2013.01); *E04G 5/00* (2013.01); *E04G 5/145* (2013.01); *E04G 5/16* (2013.01);
(Continued)

(58) Field of Classification Search
USPC ......... 256/59, 64, 65.01, 65.02, 65.14, 65.15, 256/67, DIG. 6; 403/49; 280/47.14–47.41; 248/123.2, 162.1, 292.11, 364; 182/113; 52/DIG. 12; 16/400
See application file for complete search history.

(56) References Cited

U.S. PATENT DOCUMENTS 3,752,262 A * 8/1973 Helms .............................. 256/59
4,909,483 A * 3/1990 van Herpen ..................... 256/59
(Continued)

FOREIGN PATENT DOCUMENTS

DE 3803211 A1 8/1989
DE 200 20 794 U1 3/2001
(Continued)

OTHER PUBLICATIONS

Roof Edge Protection website, www.roofedgeprotection.co/uk, 8 pages.
(Continued)

*Primary Examiner* — Josh Skroupa
(74) *Attorney, Agent, or Firm* — Wood, Phillips, Katz, Clark & Mortimer

(57) ABSTRACT

An edge protection system including spaced counterweights each having a connecting bracket on one side thereof. Cantilever arms each have vertical legs on opposite ends, with one leg pivotally secured to the counterweights and the other leg secured to hubs. The vertical legs may selectively support the cantilever arm at a height sufficient to allow workers to walk upright beneath the arm. Wedges connect ledger ends to connecting wheels on hub vertical posts, and secure a stiffener to the wheel and ledger sections. Counterweights have a U-shaped bracket and a plurality of weight blocks. The blocks are selectively stacked on the bracket with one upright leg extending through weight block center openings and the other upright leg in side slots of the blocks. A trolley has a carrying connector for connecting to a connector of the one upright leg on top of the counterweight for transporting the counterweight.

12 Claims, 27 Drawing Sheets

(51) Int. Cl.
   *E04G 5/14*   (2006.01)
   *E04G 5/00*   (2006.01)
   *E04G 5/16*   (2006.01)
   *E04G 7/20*   (2006.01)
   *E04G 7/30*   (2006.01)
   *E04G 7/32*   (2006.01)
   *B62B 1/02*   (2006.01)

(52) U.S. Cl.
   CPC  *E04G 7/20* (2013.01); *E04G 7/301* (2013.01); *E04G 7/32* (2013.01); *E04G 21/3238* (2013.01); *B62B 1/02* (2013.01); *B62B 2301/12* (2013.01)

(56) References Cited

U.S. PATENT DOCUMENTS

| | | | | |
|---|---|---|---|---|
| 5,145,153 | A | * | 9/1992 | Glynn .................. 256/59 |
| 5,188,342 | A | * | 2/1993 | Ouellette et al. ........ 256/59 |
| 5,207,527 | A | * | 5/1993 | Duncan et al. .......... 403/49 |
| 5,605,204 | A | * | 2/1997 | Ausejo ................. 403/49 |
| 6,406,002 | B1 | * | 6/2002 | Hardy et al. ........... 256/64 |
| 6,539,676 | B2 | | 4/2003 | Price |
| 6,554,257 | B1 | | 4/2003 | Kenton |
| 6,578,827 | B2 | * | 6/2003 | McCracken ............ 256/59 |
| 7,571,898 | B2 | * | 8/2009 | Higgs et al. ........... 256/59 |
| 7,665,248 | B2 | | 2/2010 | Blackford |
| 8,100,228 | B2 | | 1/2012 | Hamilton et al. |

FOREIGN PATENT DOCUMENTS

| | | |
|---|---|---|
| EP | 0 288 100 A1 | 10/1988 |
| EP | 0 389 933 A1 | 3/1990 |
| EP | 1 209 303 A2 | 10/2001 |
| EP | 1 213 409 A2 | 11/2001 |
| GB | 2 279 392 A | 1/1995 |
| GB | 2 392 198 A | 2/2004 |
| WO | 2006/001895 A2 | 1/2006 |

OTHER PUBLICATIONS

F.H. Brundle website, www.fhbrundle.com/edge.htm (2 pages).
Shorguard website, www.shorguard.co.uk (5 pages).
Layher Ltd. Brochure, Edge Protection (1 page).
ALFLIX Scaffold Catalogue System (21 pages).
Kee Guard Brochure, The Safety Solutionfor Free Standing Roof Edge Protection (2 pages).
Preston Superbarrier Pty Ltd Brochure, Superbarrier Edge Protection (4 pages).
Shorguard SG4 Flat Roof Guardrail System Brochure (4 pages).

* cited by examiner

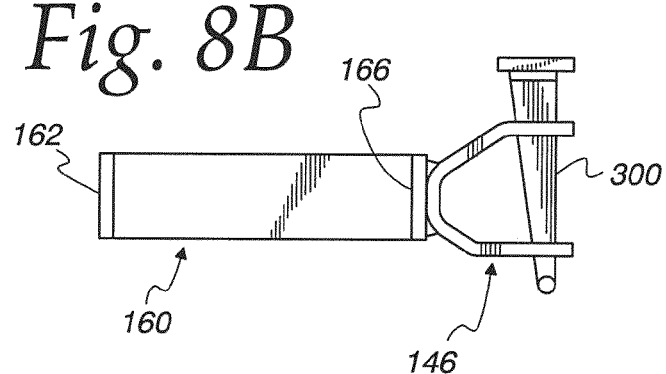
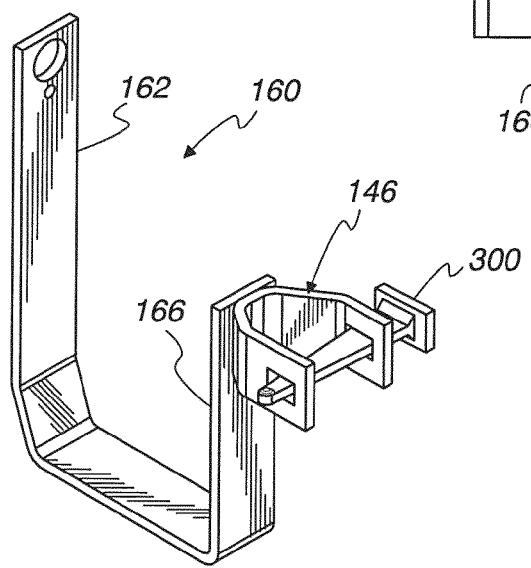
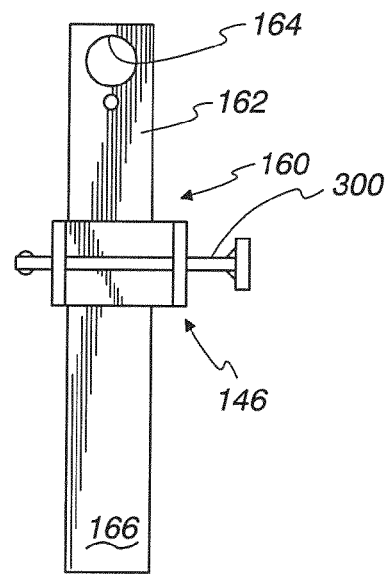
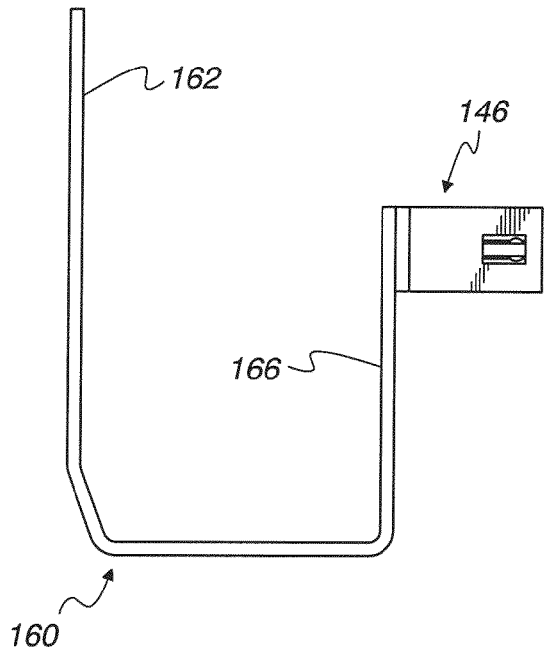

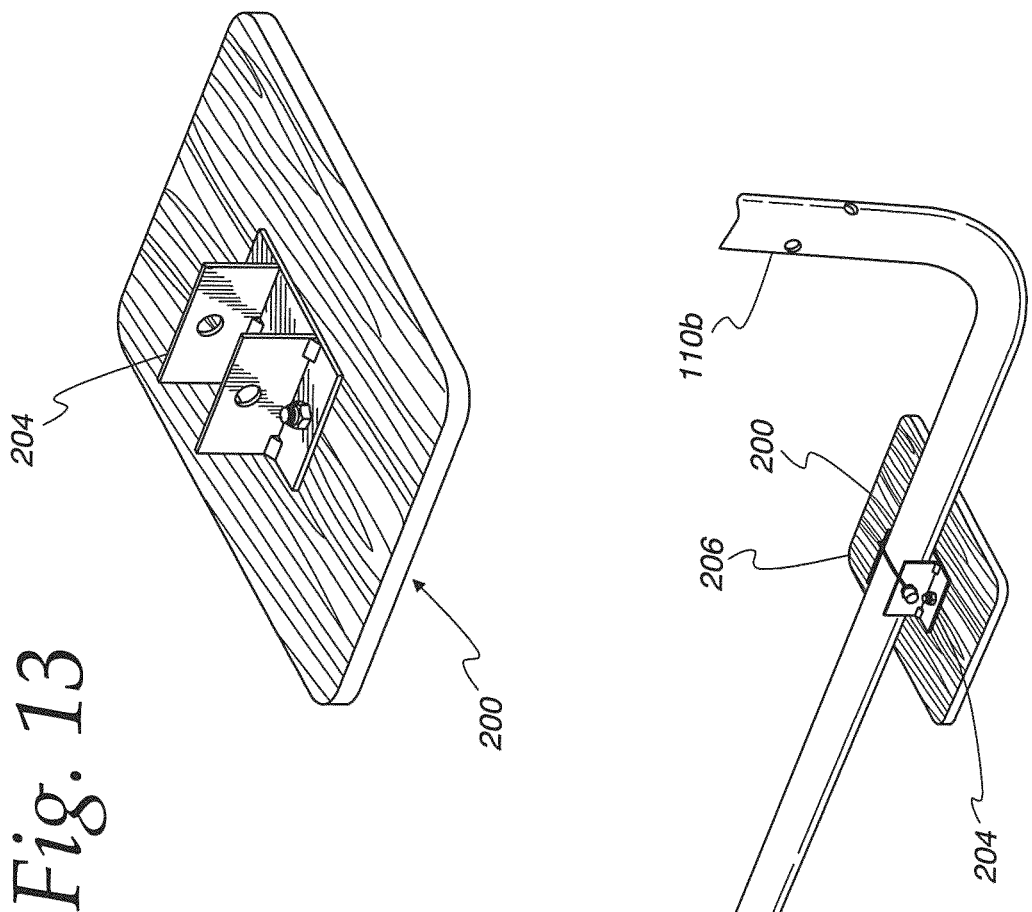
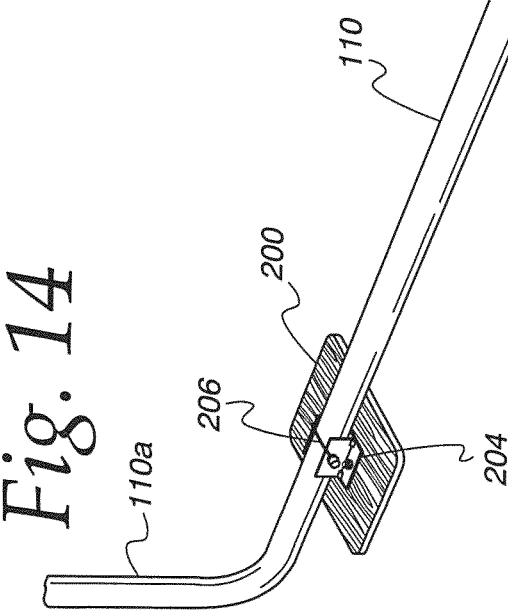

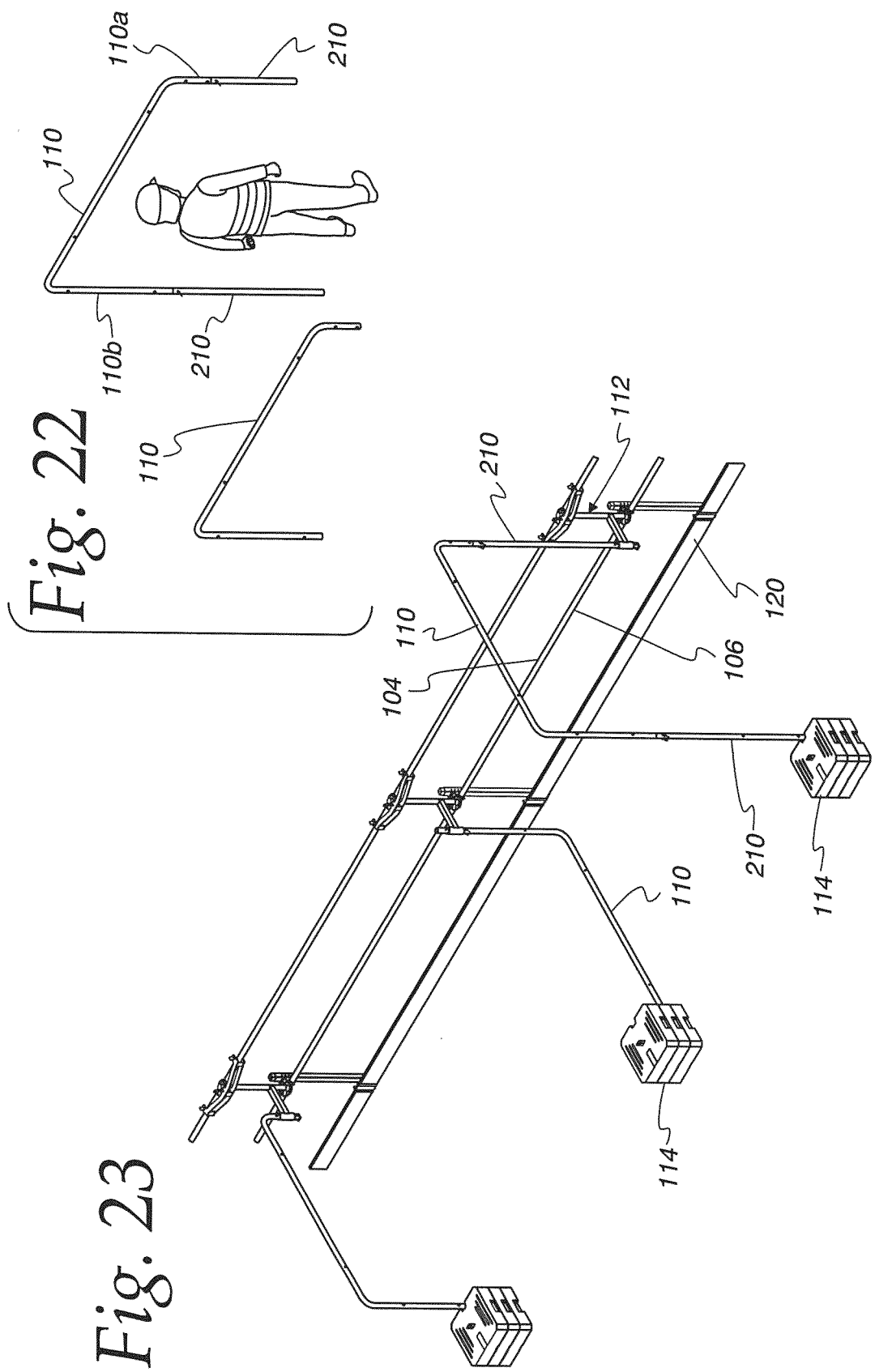

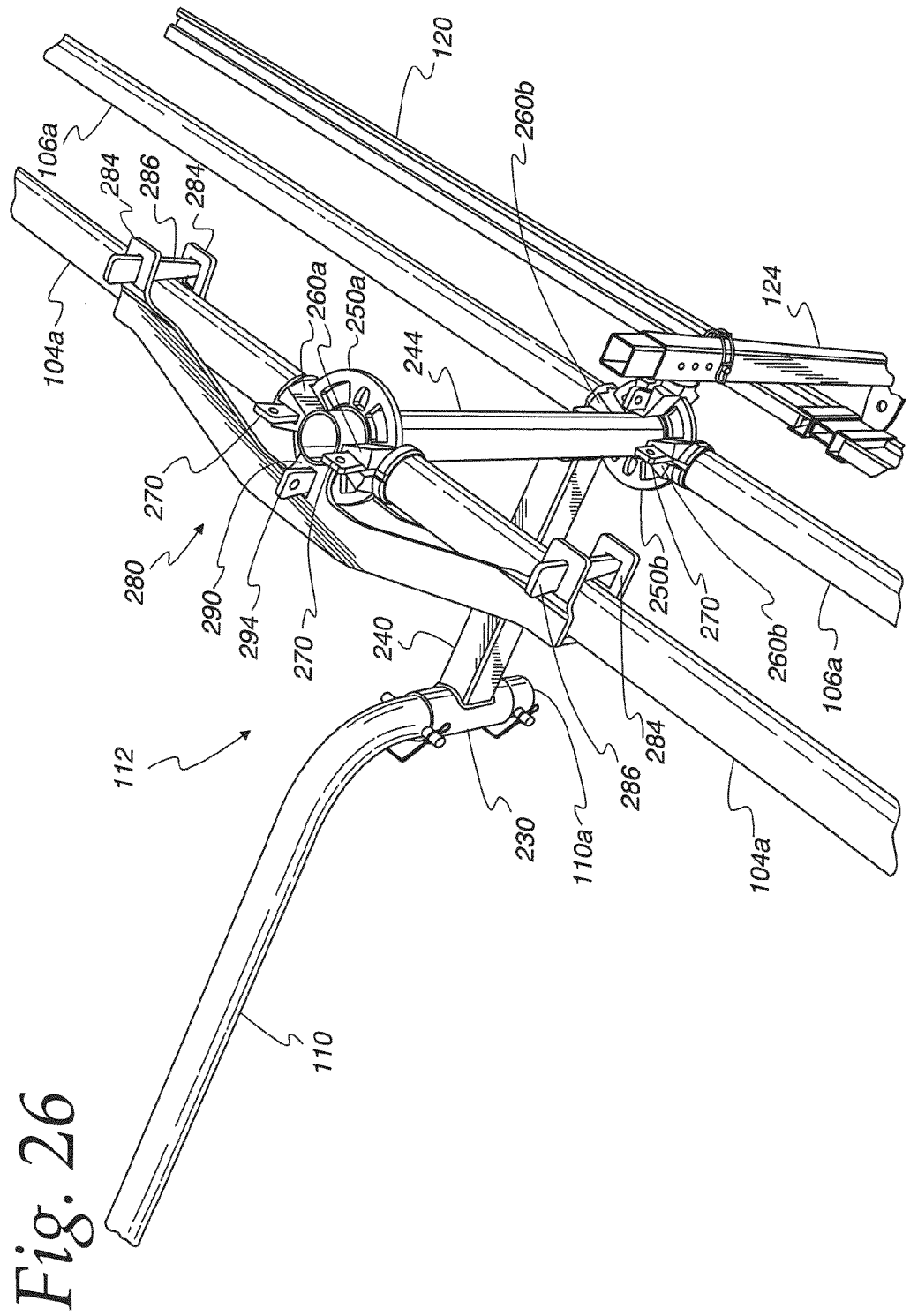

EDGE PROTECTION SYSTEM USING CANTILEVERED COUNTERWEIGHT

CROSS-REFERENCE TO RELATED APPLICATIONS

This is a non-provisional continuation-in-part application of provisional U.S. Ser. No. 61/612,056, filed Mar. 16, 2012.

BACKGROUND

Edge protection, for example barriers such as balustrades or railings, may be required by building codes, government regulations, and a prudent concern for safety of workers who may perform tasks close to edges. Some environments allow the semi-permanent attachment of edge protection to permanent building structures, for example attaching rail support posts to roof structures with screws or nails. However, in some environments edge protection cannot be semi-permanently attached in this way.

SUMMARY

An edge protection system is disclosed herein, including a plurality of spaced counterweights each having a connecting bracket on one side thereof, a plurality of cantilever arms each having a vertical leg on one end, a plurality of hubs each secured to the other end of one of the cantilever arms, and a plurality of ledgers wherein at least two ledgers are secured to and between adjacent hubs. In one aspect, each of the vertical legs are pivotably secured to one of the connecting brackets for pivoting about a vertical axis of the leg. In another aspect, each of the cantilever arms also have a second vertical leg on the other end, wherein the first and second vertical legs support the cantilever arm at a height sufficient to allow workers to walk upright beneath the arm.

In one form of the edge protection system, the cantilever arms have vertical legs on both ends, wherein a vertical connector in the hub receives one of the cantilever arm vertical legs, a horizontal arm connects a vertical post to the hub vertical connector, and first and second vertically spaced connectors on the vertical post connect two vertically spaced ledgers to the vertical post.

A hub for connecting adjacent first and second ledger sections of ledgers of an edge protection system is also disclosed, with the ledger sections having connectors on their ends. The hub includes a vertical post, at least one stiffener having brackets on opposite ends connected to first and second ledger sections, and a connecting wheel on the vertical post. The connecting wheel has radially extending slots therein, and the first and second ledger sections are secured at a selected orientation by wedges through the ledger section connectors and selected slots in the first connecting wheel, with the stiffener secured to the connecting wheel by a wedge extending through the stiffener and another selected slot in the connecting wheel.

In a further form of the hub, a second set of ledger sections are similarly secured by wedges to a second connector to support a second ledger.

A counterweight system for an edge protection system having cantilever arms is additionally disclosed, including a U-shaped bracket having two upright legs and a plurality of weight blocks each having a vertical center opening therethrough and a slot on one side. One of the upright legs has a connector on its upper end and the other of the upright legs has a bracket for connecting to a vertical leg of one of the cantilever arms, wherein a selected number of the blocks are stacked on the U-shaped bracket with the U-shaped bracket one upright leg extending through the center openings and the other upright leg in the slots.

In a further form of the counterweight system, a trolley has an axle with a pair of wheels and a carrying connector adapted to selectively connect to the U-shaped bracket connector, whereby the trolley may be pivoted around the axle to lift a connected counterweight and then rolled to transport the counterweight to a selected location. In a still further form, the carrying connector is adjustable on the trolley by a gas strut.

The disclosed edge protection system may be variously used with the disclosed hub and counterweight systems.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIGS. 3A-3C illustrate selection and movement of counterweights to desired positions, FIG. 3D illustrates assembly of the cantilever arm and hub of one bay of the edge protection system, FIG. 3E illustrates connection of the cantilever arms and hubs to the positioned counterweights, FIG. 3F illustrates connection of a first set of ledger sections to the hubs of the system, and FIG. 3G illustrates an assembled edge protection system with a plurality of extended ledgers;

FIG. 8A is a perspective view of the counterweight U-shaped bracket, said bracket being shown in orthogonal views in FIGS. 8B-8D;

FIG. 13 illustrates a support pad;

FIGS. 14-15 illustrate support pads secured to and underlying a cantilever arm positioned adjacent the surface;

FIGS. 22-23 are perspective views illustrating the cantilever arm raised above the surface sufficiently to allow a worker to walk upright beneath the arm;

FIGS. 24-26 are perspective views variously illustrating the hub and its connection to ledger sections.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Figure 1:
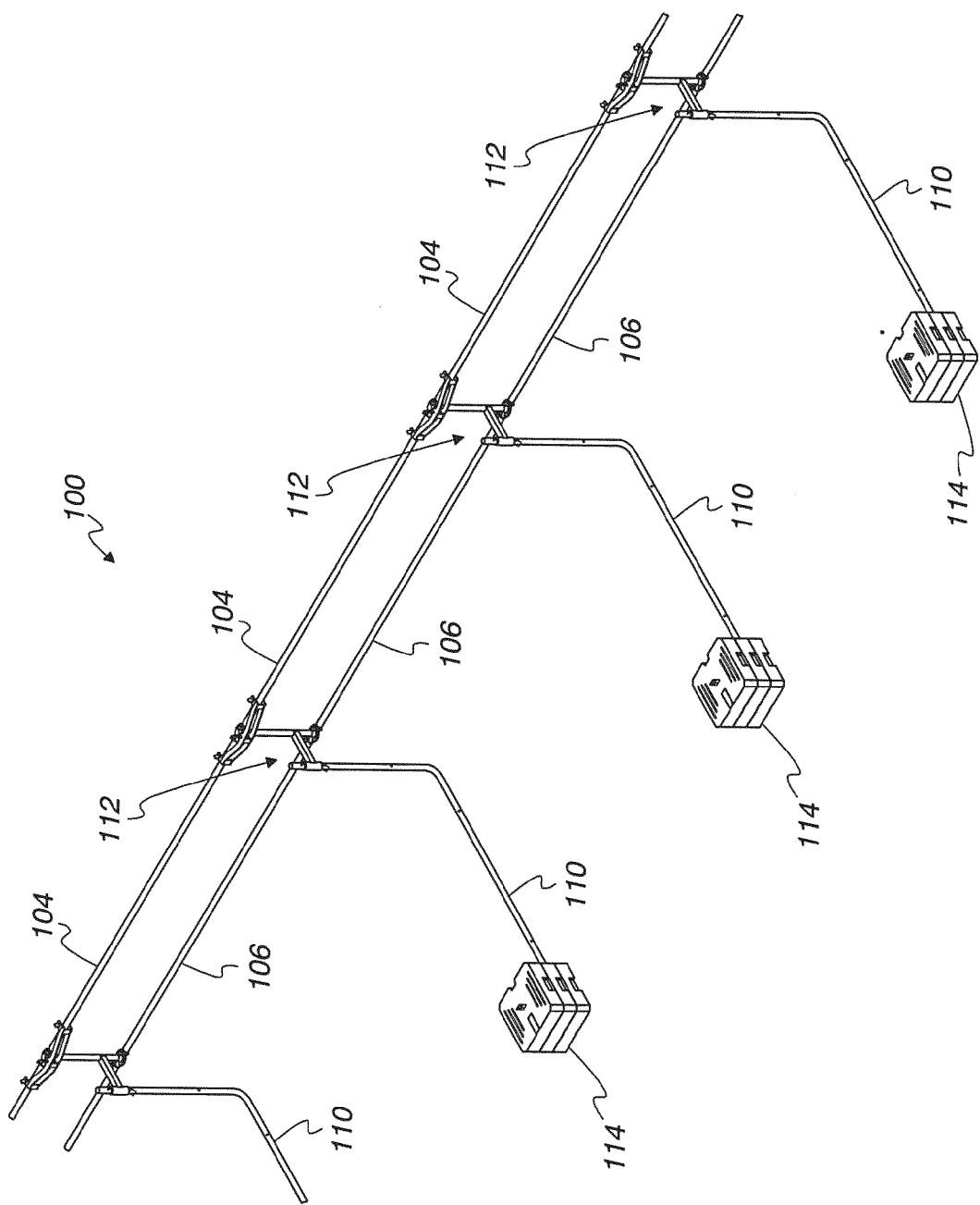
FIG. 1 is a perspective view of one form of the cantilevered edge protection system disclosed herein.
Figure 21:
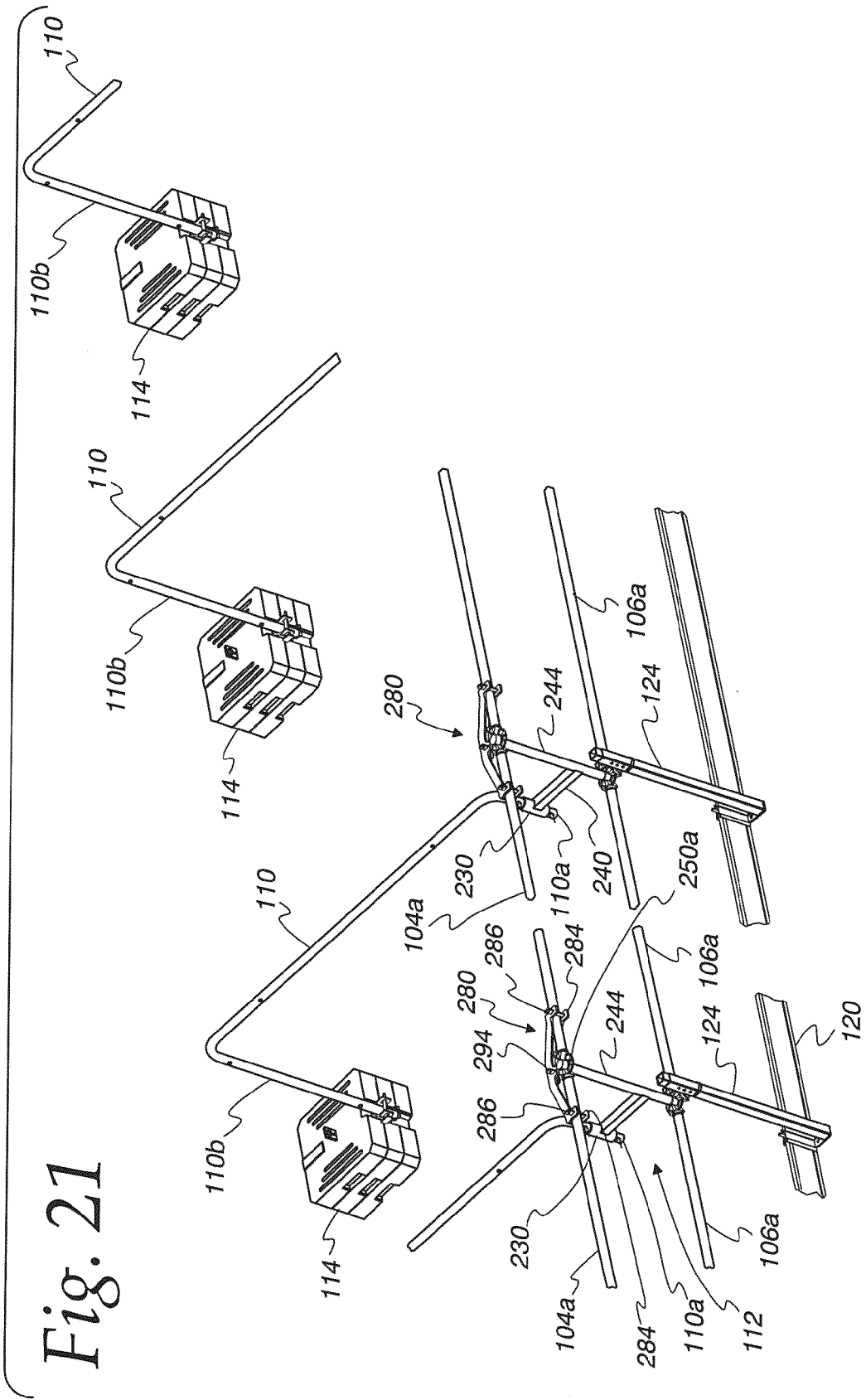

An edge protection system using cantilevered counterweights is disclosed herein. Many embodiments, components, and alternative structures for implementing such an edge protection system are illustrated in FIGS. 1-27E. In some circumstances edge protection systems and/or fall safety systems fill a market demand for use in roof areas where no penetration of the roof surface is allowed for attaching and/or fixing the system. In an embodiment, the edge protection system of the present disclosure comprises two horizontal scaffold ledgers connected to a hub that is coupled to a support post. The scaffold ledgers provide guardrail functionality. In an embodiment, two or more hubs may be coupled to a support post, and the edge protection system may provide two or more parallel guardrails, an upper guardrail, a lower guardrail, and possibly one or more guardrails between. The hubs may promote assembling a plurality of edge protection bays, as best seen in FIG. 1. The hubs are constructed so the bays may join at angles, for example at a 45 degree angle or a 90 degree angle, for example at a corner of a roof. One end of the cantilever arm couples to the support post, and an opposite end of the cantilever arm couples to one or more counterweights. In an embodiment, the joint of the horizontal scaffold ledgers connected to the hub may be reinforced with a stiffener or support bracket, as seen particularly in FIGS. 21, 25 and 26. It is understood that a variety of alternative embodiments are contemplated, as can be seen in FIGS. 1-27E.

In an embodiment, the edge protection system is composed of components that are each of a weight and size that can readily and safely carried by a worker without physical injury, when handled with standard care and attention. The edge protection system of the present disclosure provides significant and new utility. The cantilever arms solve the previous problem of gaining access to work under the position of cantilever arms of non-attaching edge protection systems. The system is designed to be quickly assembled (e.g., in three minutes per bay) by normally skilled workmen who may be involved in working on roofs or other work places where edges are encountered.

Figure 11:
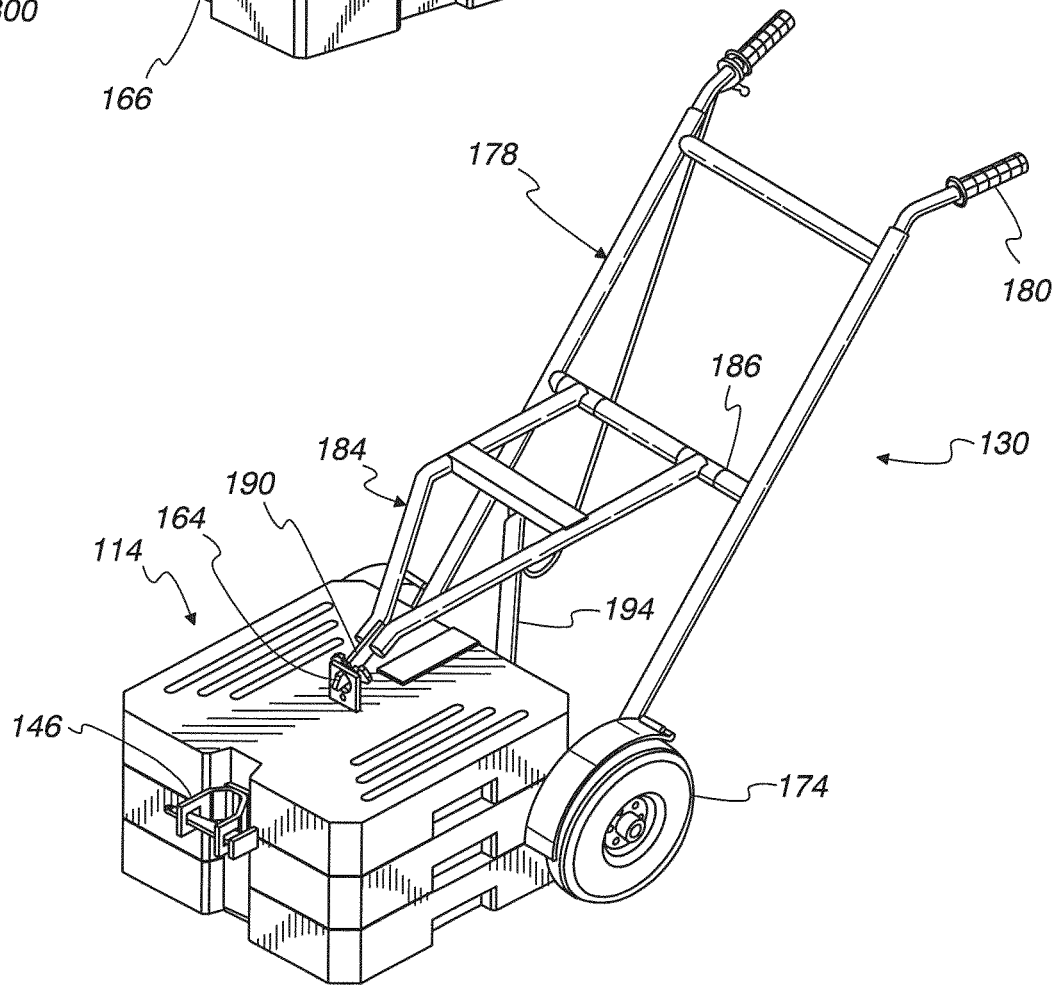
FIG. 11 is a perspective view showing an assembled counterweight secured to a carrying trolley.
Figure 12A:
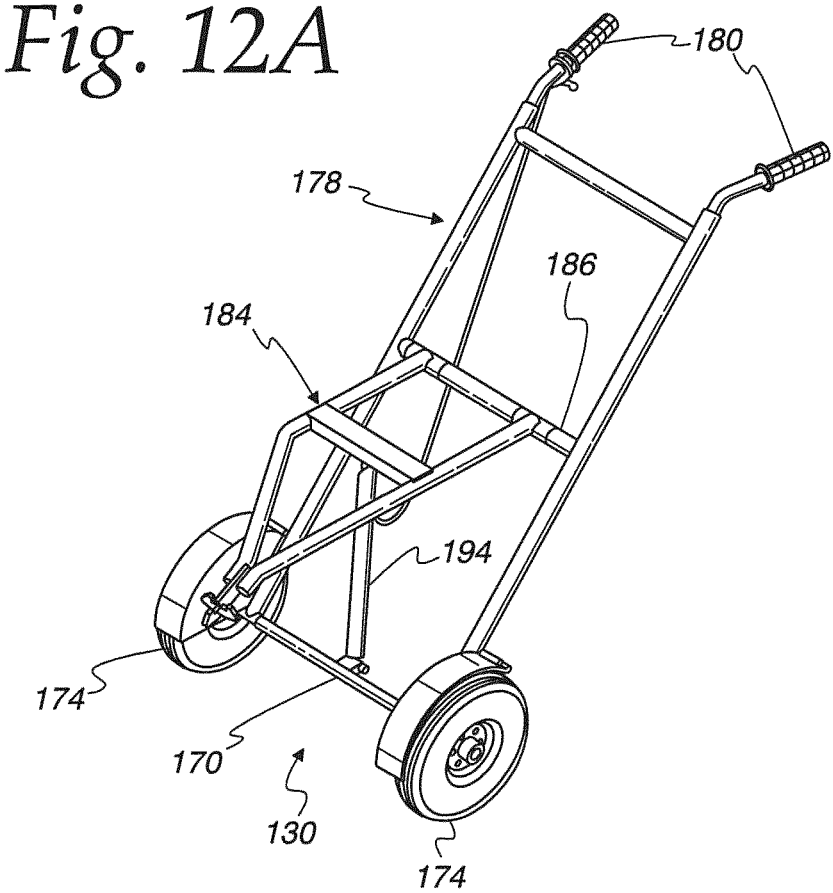
FIG. 12A-12E illustrate the trolley, with FIG. 12A being a perspective view, FIGS. 12B-12D being orthogonal views, and FIG. 12E being a cross-sectional view through the axle in FIG. 12D.
Figure 12B:
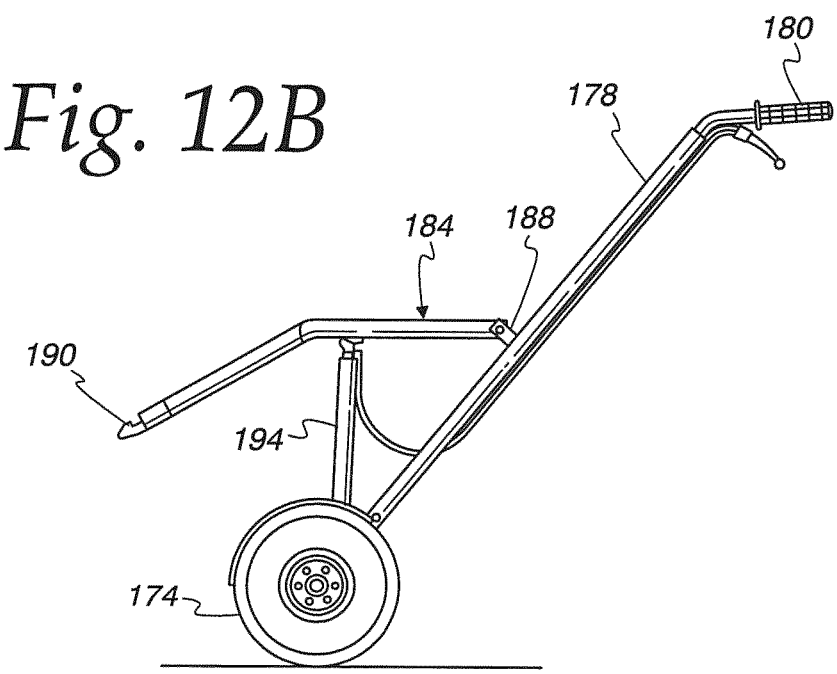
Figure 12C:
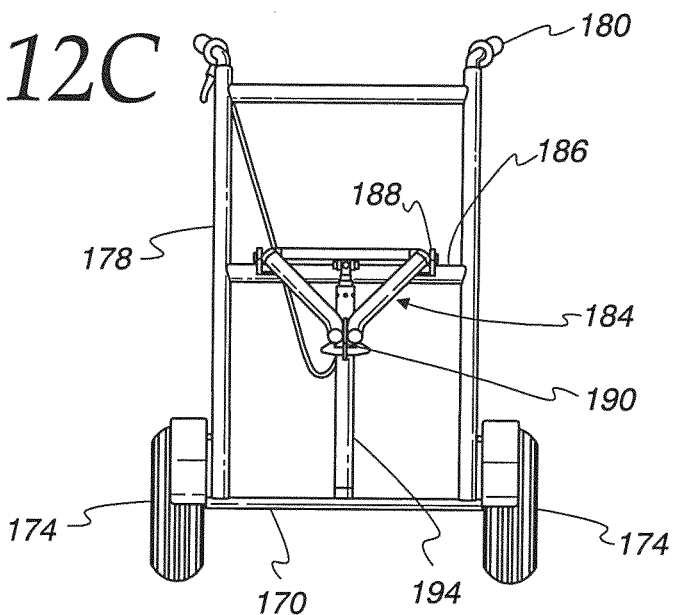
Figure 12D:
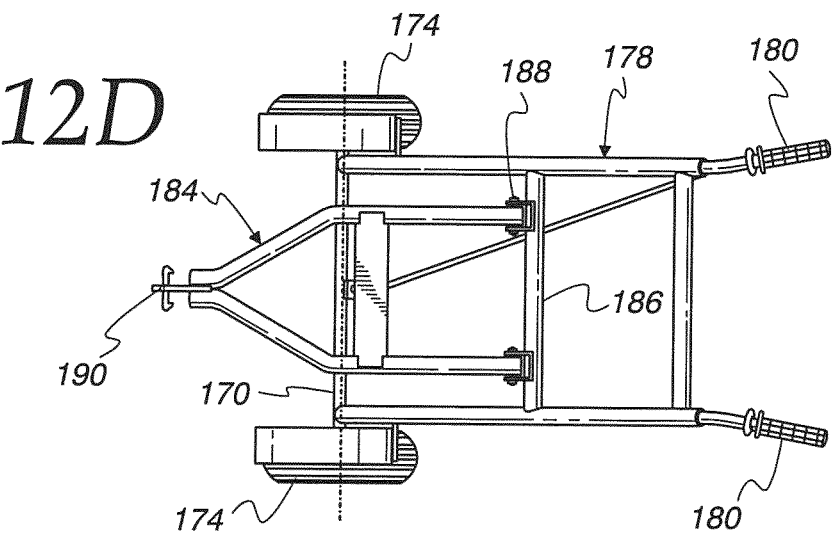
Figure 12E:
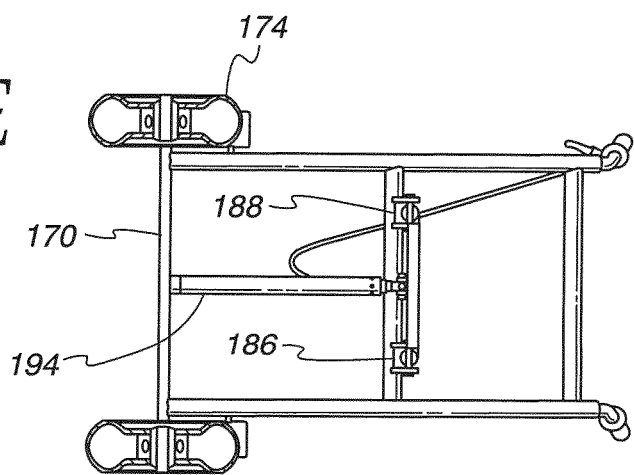
Figure 15:
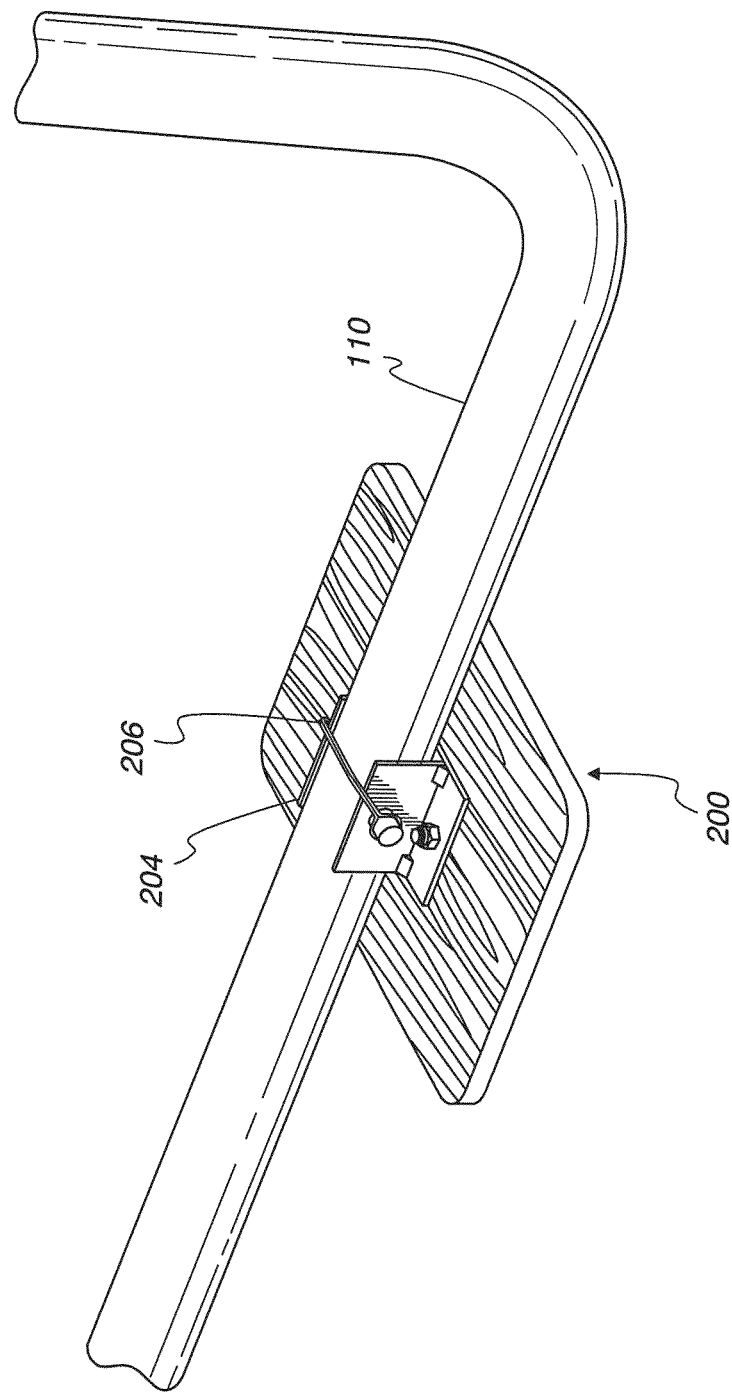
Figure 16:
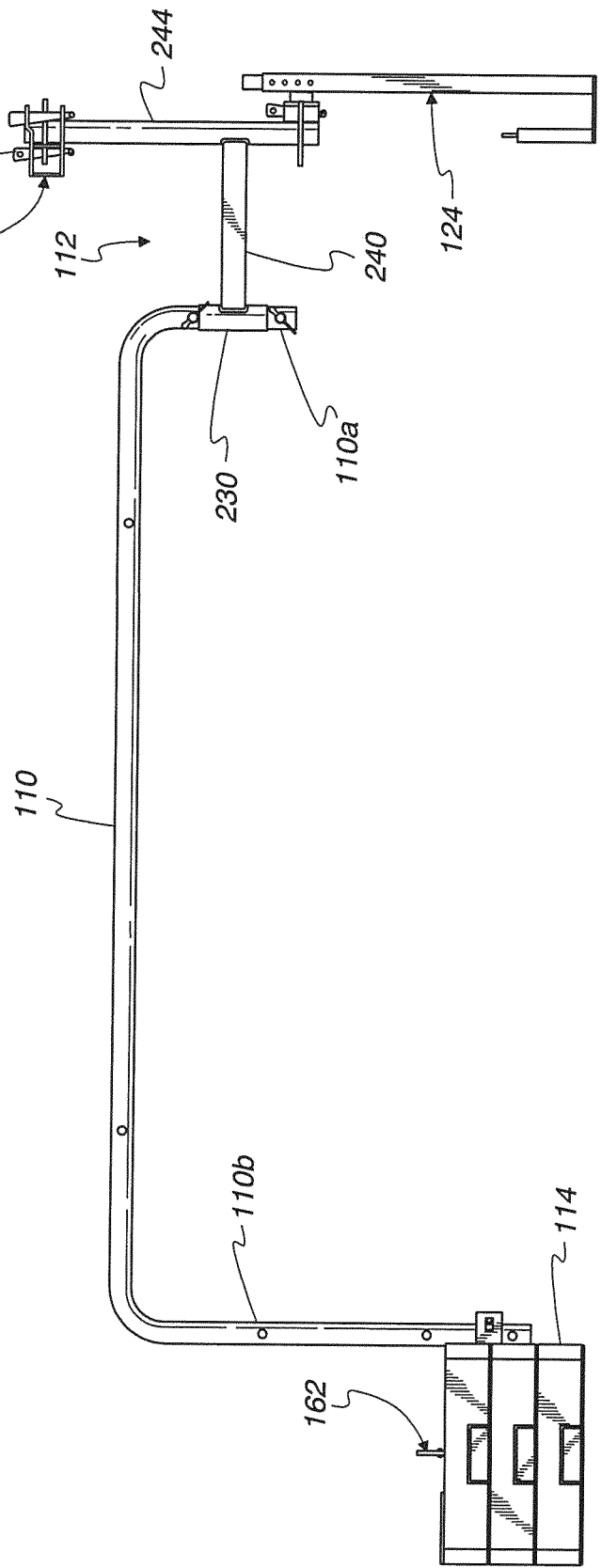
FIG. 16 is a side view illustrating a cantilever arm connected in a position spaced from the surface between a counterweight and a hub.
Figure 17:
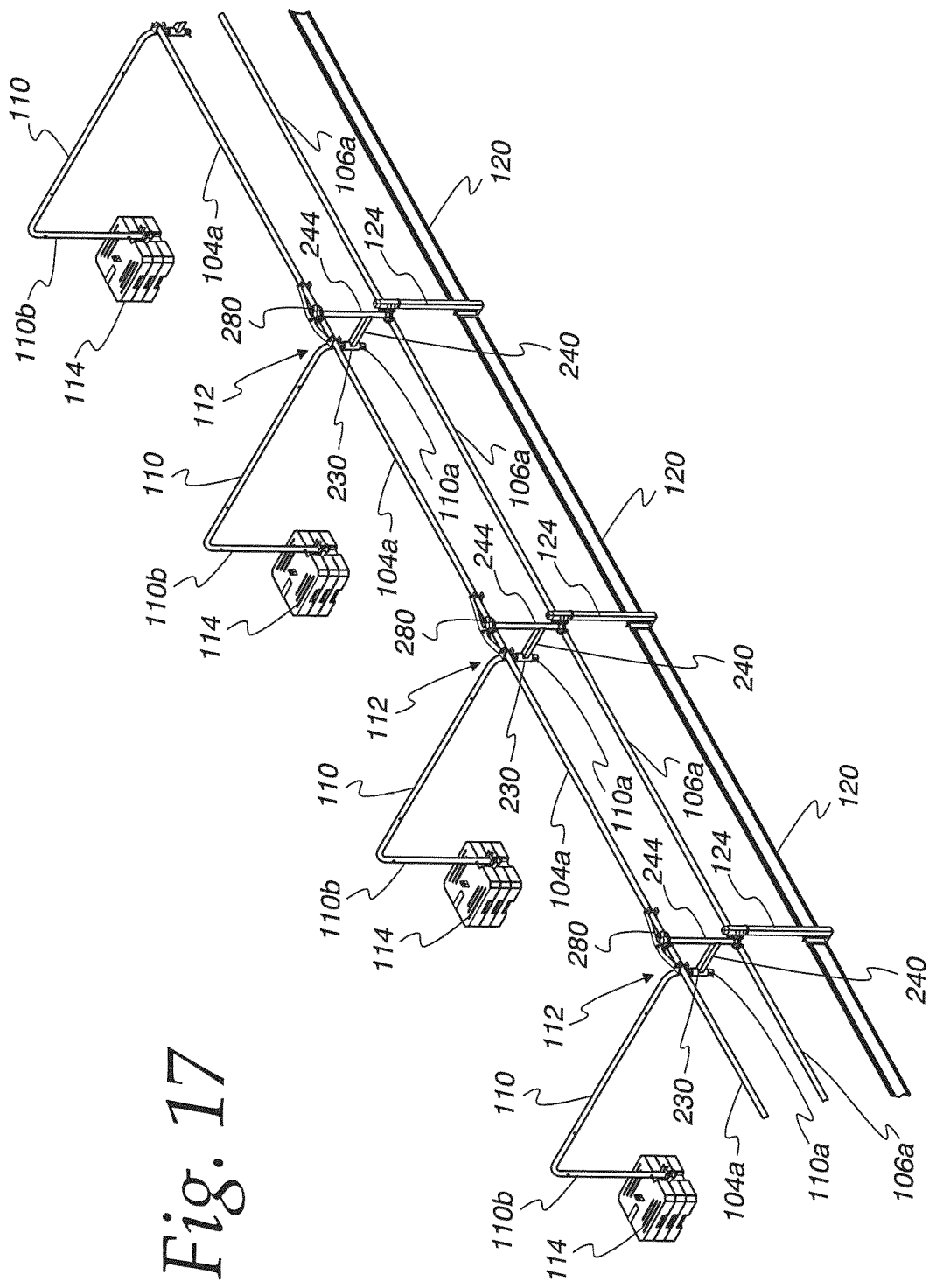
FIGS. 17-21 are perspective views variously illustrating the edge protection system with the cantilever arms raised above the surface.
Figure 18:
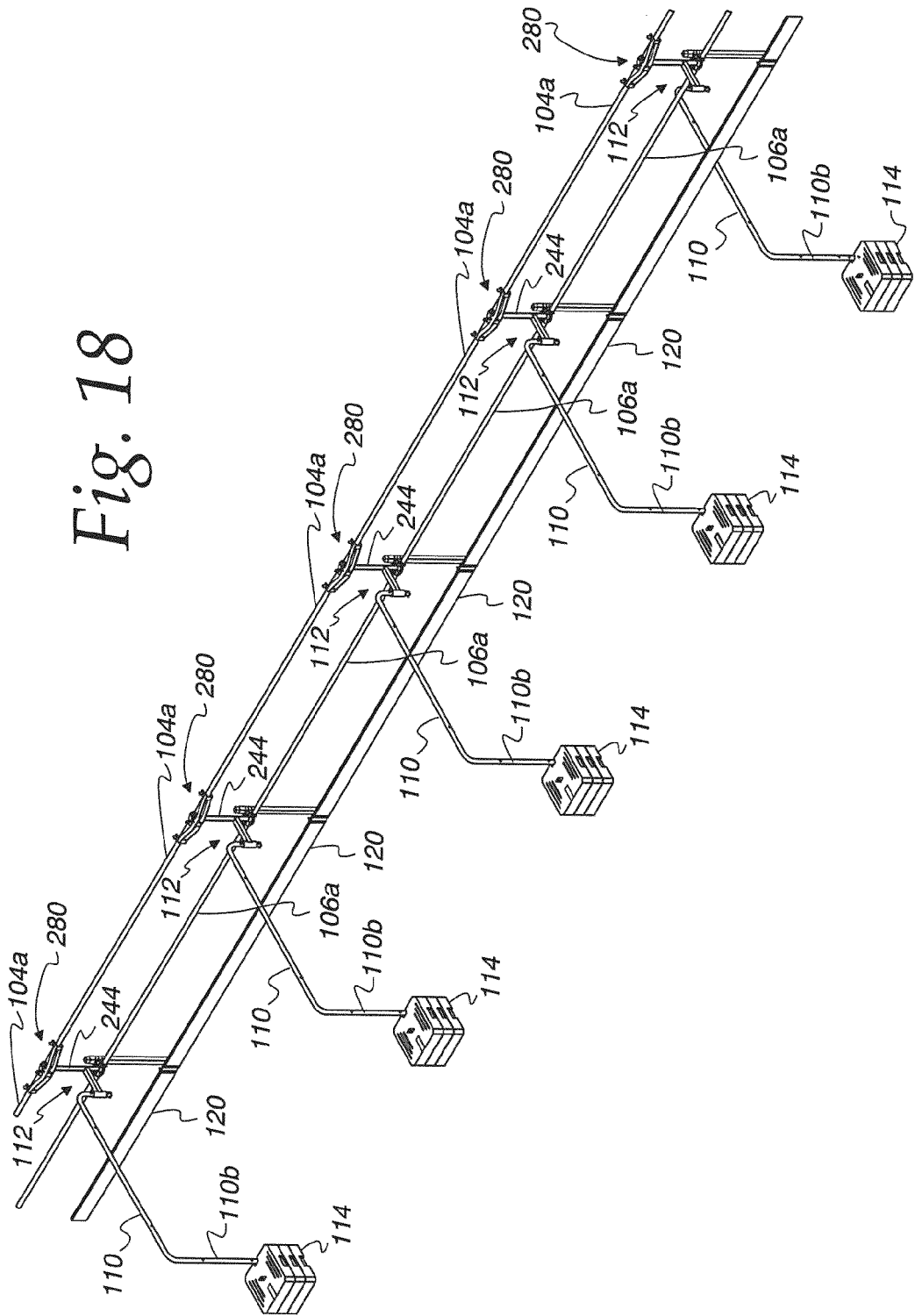
Figure 19:
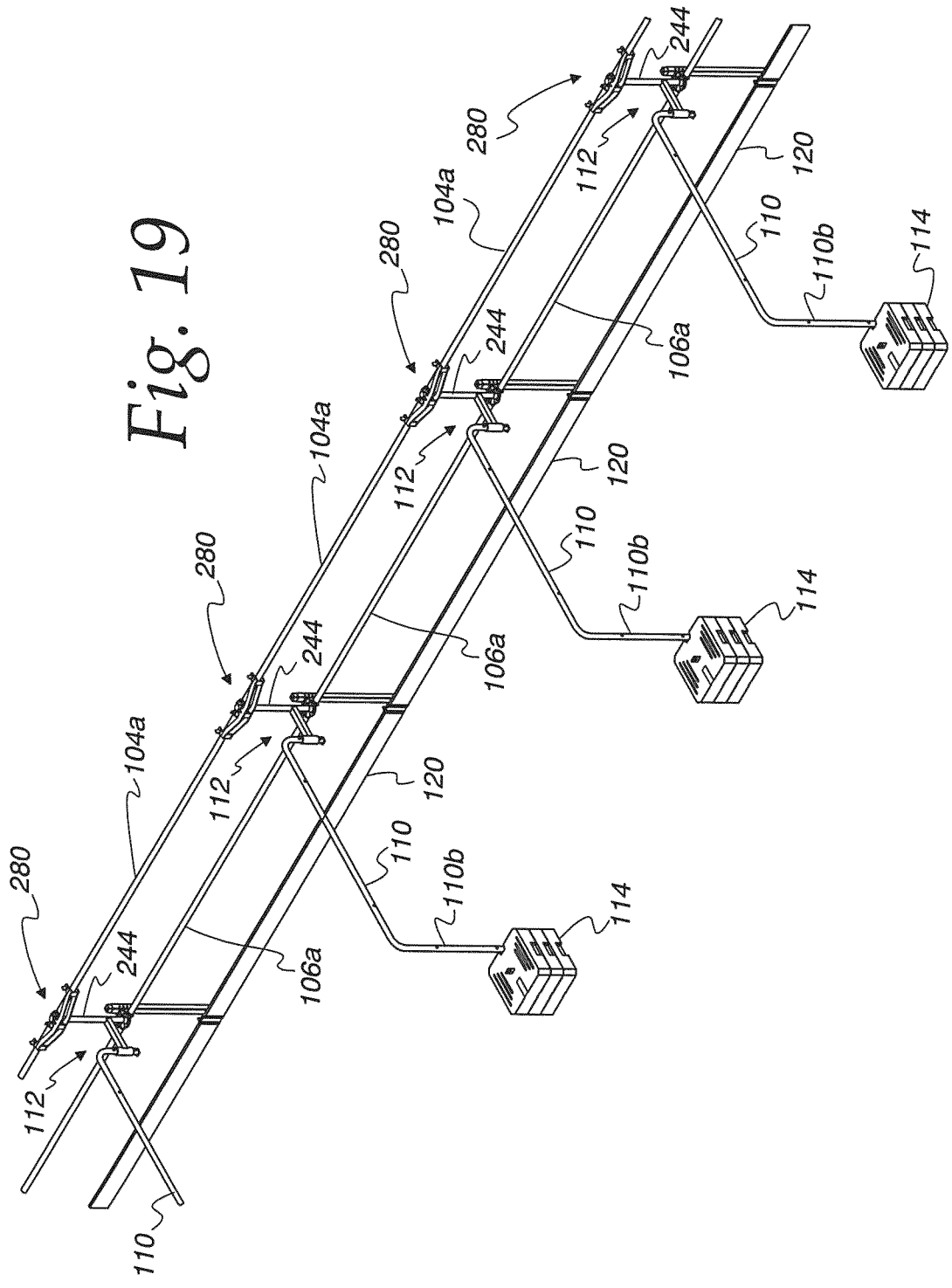
Figure 20:
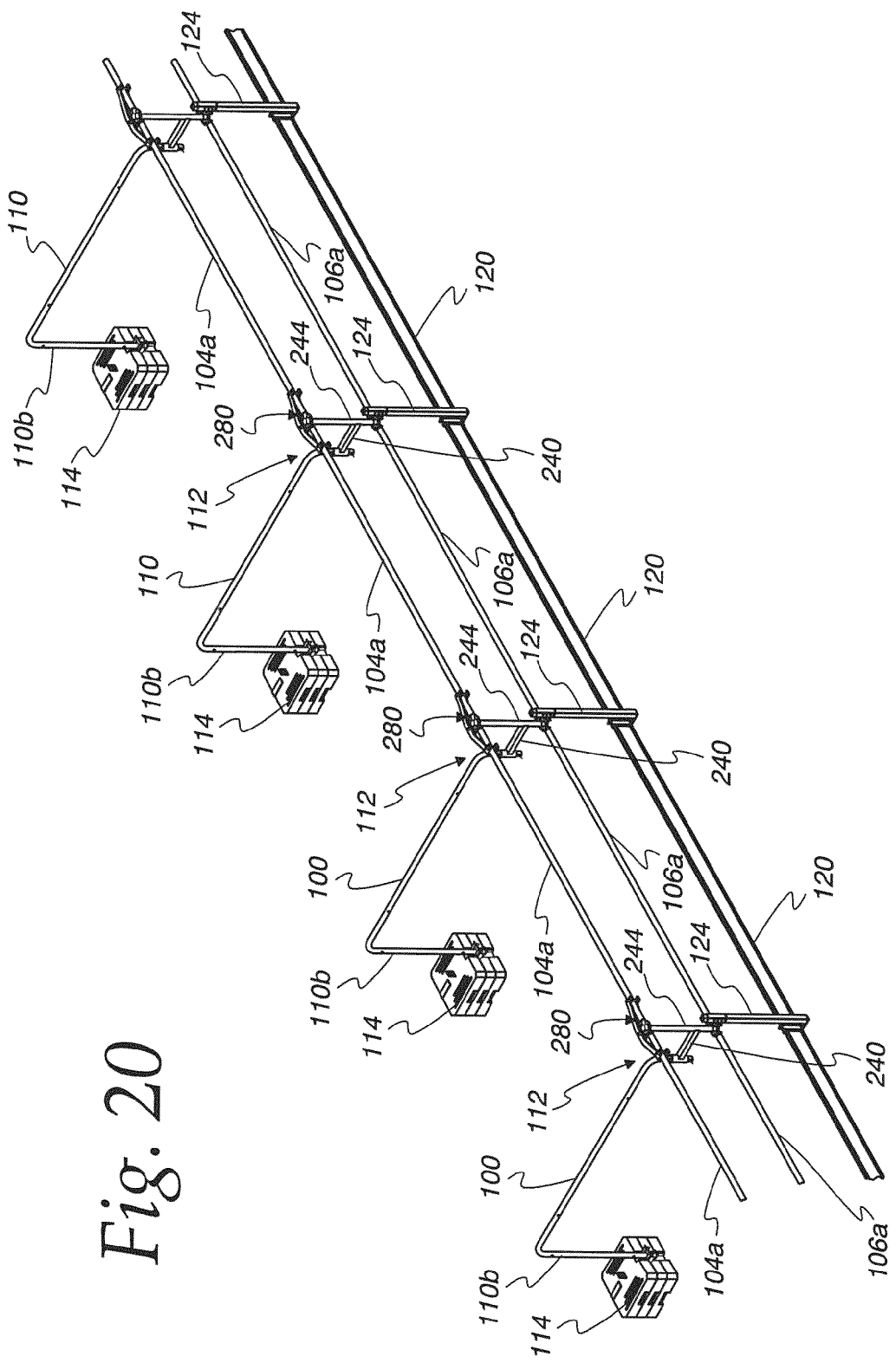

In an embodiment, a carry trolley is contemplated for moving and mounting counterweights on the end of the cantilever arm. An embodiment of a carry trolley is illustrated in FIGS. 11-12, but other embodiments of the carry trolley that differ from that illustrated in FIGS. 11-12 are contemplated. When installed, the edge protection system may be supported by the cantilever arm and the support post that may be in contact with the roof. In an embodiment, support pads may be coupled to the cantilever arms and/or to the base of the support posts to distribute the weight of the edge protection system over a larger area on the roof to prevent excess compression stress. An example of support pads are illustrated in FIGS. 13-15. In an embodiment, toe boards may be coupled to a lower end of the edge protection system. The toe boards may serve to protect workers from falling off the edge, to remind workers of their proximity to the edge and to prevent their feet and/or lower legs from passing under a lower guardrail and slipping off the edge, for example an edge of a roof. Examples of a toe board are illustrated, for example, in FIGS. 2, 4, 17 and 21.

The cantilever arms of the edge protection system disclosed herein incorporate a number of new and useful features. The cantilever arms of the edge protection system may be pivoted around a vertical axis to make the surface below the cantilever arm accessible to work, for example accessible to refurbishing a roof surface below the cantilever arm. Additionally, the cantilever arms of the edge protection system may be coupled to the support post and/or hub in different orientations. One of the coupling orientations involve the cantilever arm holding the counterweights so cantilever arm is not in contact with the support surface, for example with a roof. FIGS. 3D-G, 5, 10 and 16-26 illustrate various positions of the cantilever arms in which the arm does not contact the support surface.

In an embodiment, the edge protection system may be composed of some components that are similar to known scaffolding equipment, such that workman may readily understand how to assemble the edge protection system as a result of their presumed familiarity with typical scaffolding equipment. Components may couple together at joints that are secured using pins such as wedge shaped pins that can be hammered securely into position. It is contemplated that the edge protection system can be assembled for use with limited simple tools, such as a hammer.

In an embodiment, the cantilever arms may be about 2 meters long, and the assembled counterweights coupled to each cantilever arm when the edge protection system is fully assembled and/or installed may each weigh about 45 kilograms. In an embodiment, the assembled counterweights may comprise three separate counterweight bodies, each body weighing about 15 kilograms. It will be appreciated that in other embodiments, cantilever arms having different lengths and counter weights having different weights may be used.

The trolley may comprise a gas strut that may be used to adjust a height of a counterweight carrying point of the trolley. For example, the carry point may be adjusted to about waist high to promote minimal lifting in moving individual counterweight bodies from a storage rack in a vehicle or truck to the carrying point of the trolley. The trolley may feature wheels at the base of the trolley and one or more handgrips for moving the trolley, either by pushing or pulling. The handgrips may couple to the trolley with a long lever arm to reduce the force needed by a workman to lift and move the counterweights placed on the support point. The counterweights may be picked up from any of three different directions by the trolley.

More specific reference to the Figures will now be had.

Figure 2:
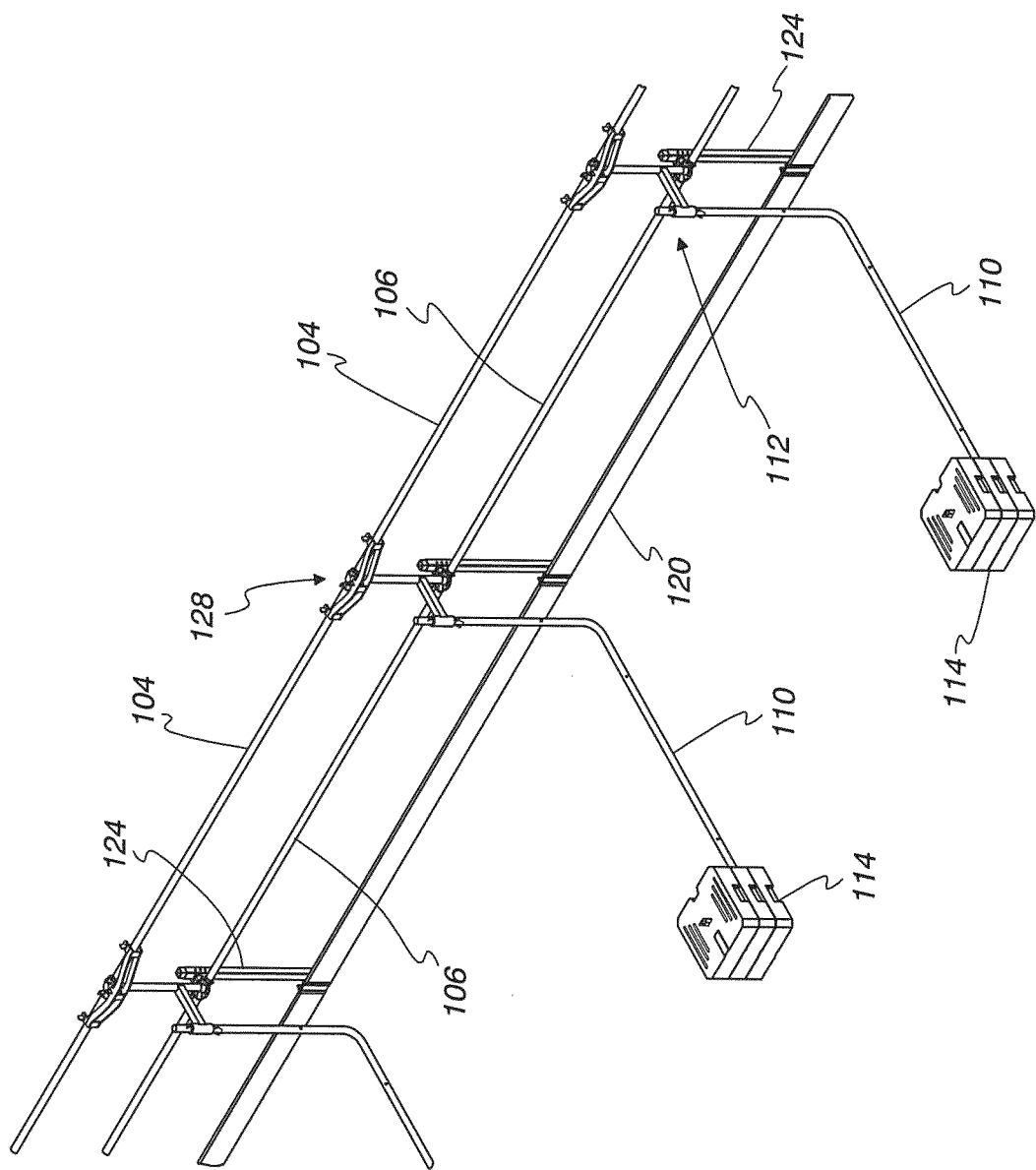
FIG. 2 is another perspective view of the FIG. 1 form of the cantilevered edge protection system disclosed herein.

FIGS. 1-2 illustrate a portion of two forms of the edge protection system 100 disclosed herein, wherein at least two ledgers 104, 106 (which may be a plurality of, e.g., horizontal pipes) are supported by the cantilever system including cantilever arms 110 with hubs 112 on one end suitably supporting the ledgers 104, 106, and secured on the other end to counterweights 114. A toe board 120 is also supported by vertical support legs 124 in the FIG. 2 structure, which also includes stiffeners 128 to aid in securing the top ledger 104. The support legs 124 may also be used without a toe board (e.g., may be added to the FIG. 1 system to assist in supporting the ledgers 104, 106.

Figure 3A:
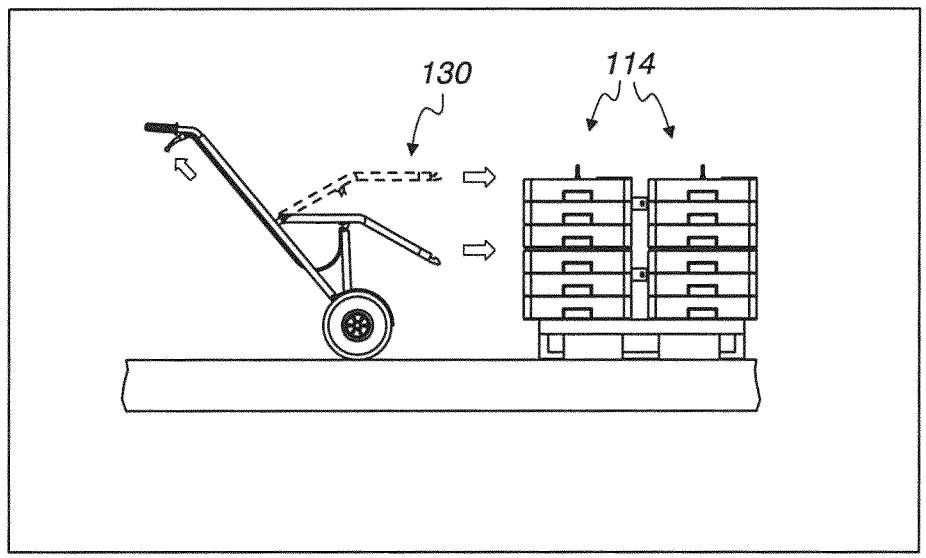
FIGS. 3A-G illustrate the sequence of steps of assembling the edge protection system with the cantilever arms spaced above the surface, where.
Figure 3B:
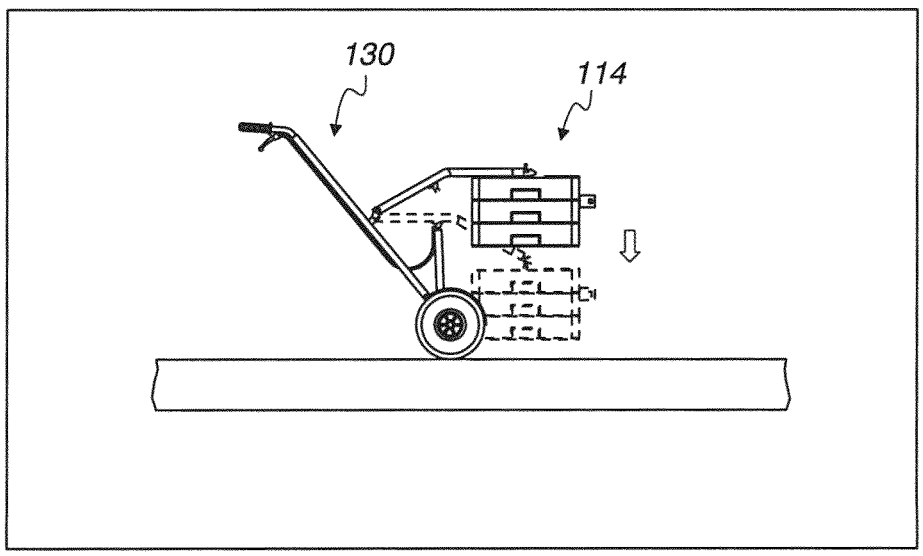
Figure 3C:
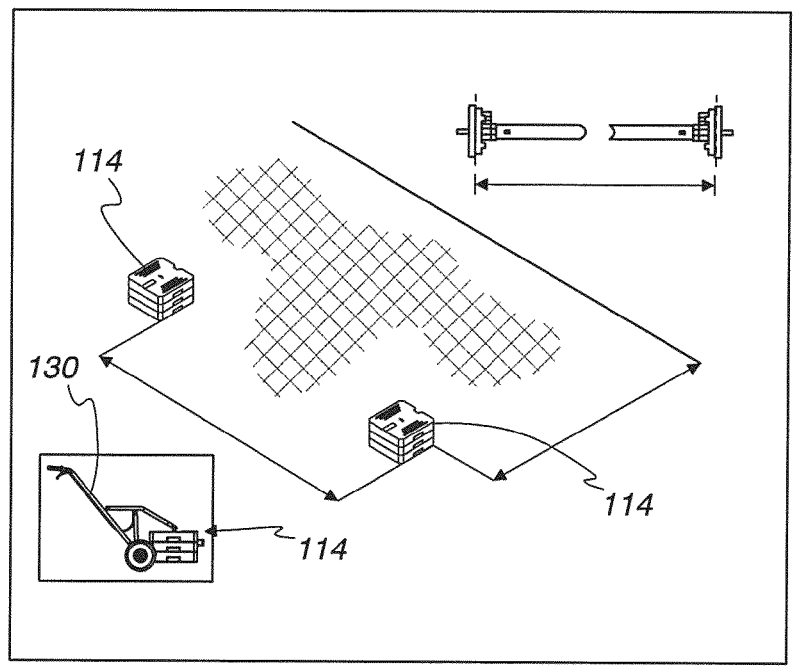
Figure 3D:
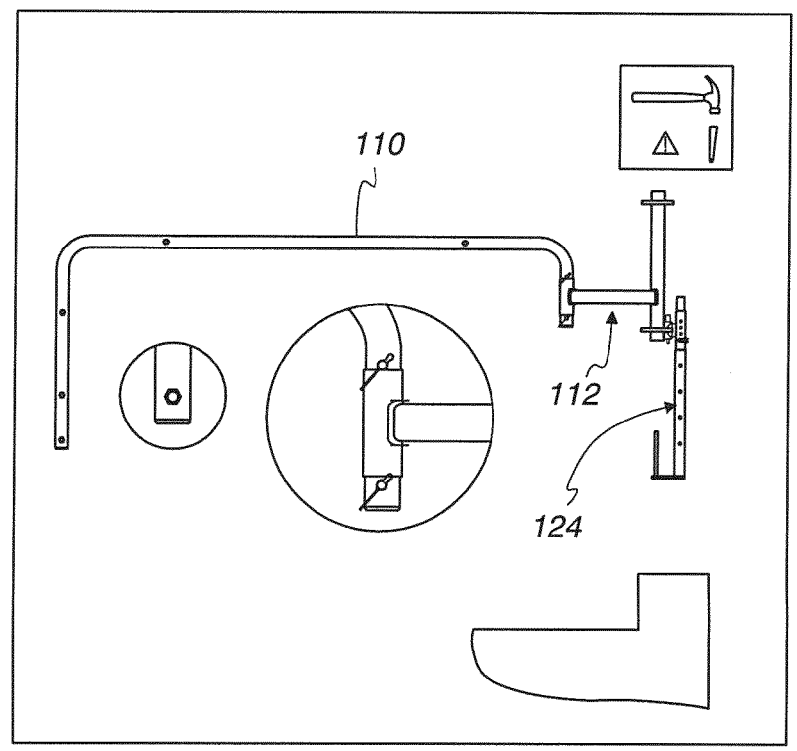
Figure 3E:
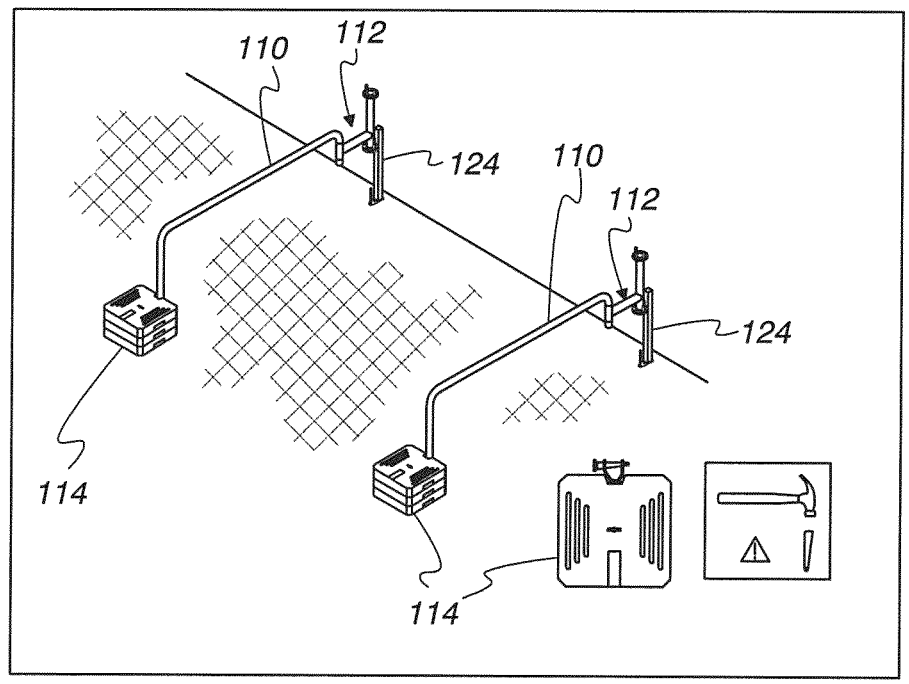
Figure 3F:
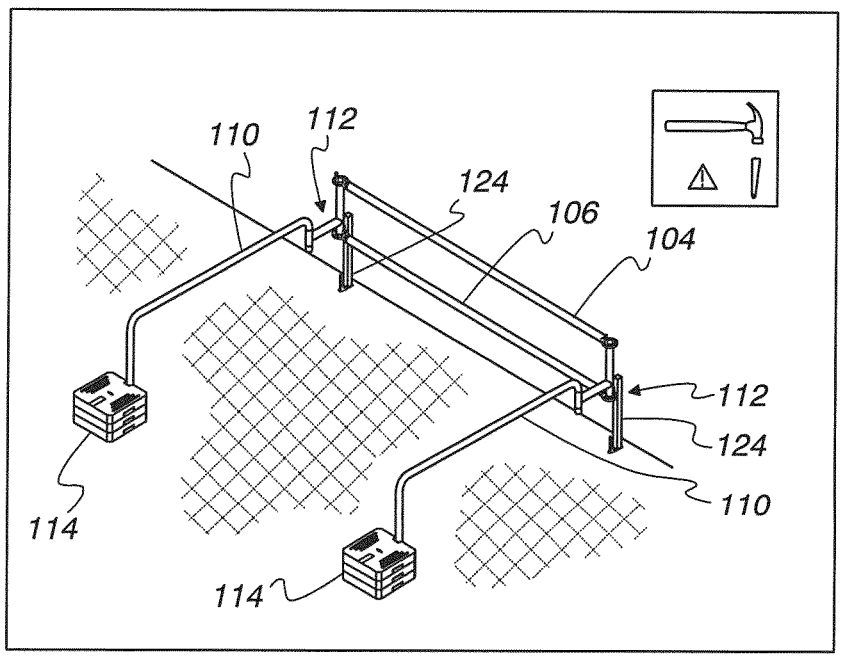
Figure 3G:
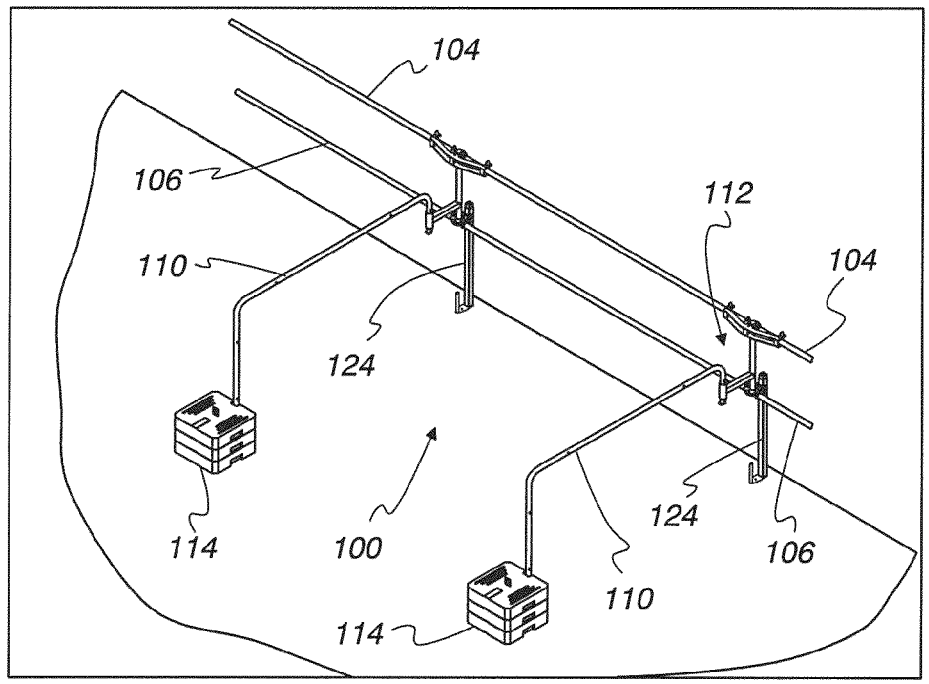

FIGS. 3A-3G illustrate a sequence of installing an edge protection system as disclosed herein. As illustrated in FIGS. 3A-3B (and further described herein), a trolley 130 may be used to lift and move counterweights 114 to the desired position (FIG. 3C) in the area requiring edge protection (e.g., a roof). Selected cantilever arms 110 with hubs 112 (FIG. 3D) are then secured to the positioned counterweights 114 (FIG. 3E), after which the ledgers 104, 106 may be secured between adjacent hubs 112 (FIG. 3F). This process may be repeated with multiple ledgers 104, 106, counterweights 114, cantilever arms 110 and hubs 112 (FIG. 3G) to extend the edge protection system 100 to whatever length required.

Figure 4:
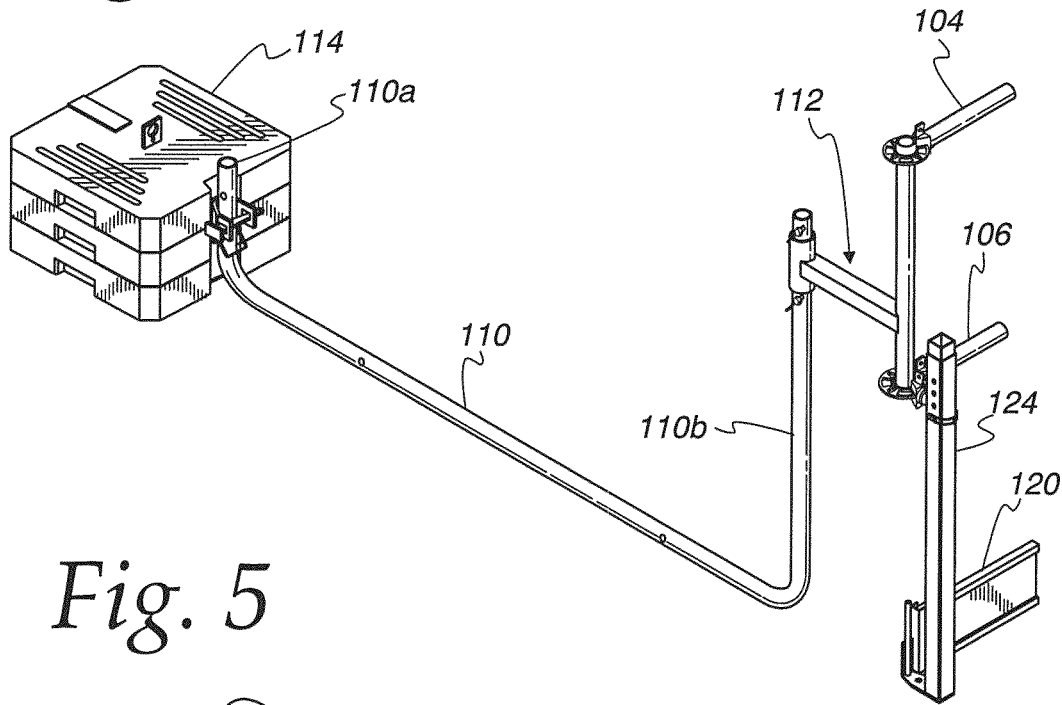
FIG. 4 is a perspective view of a counterweight, cantilever arm, hub and ledger sections, wherein the cantilever arm is adjacent the surface as in FIGS. 1-2.
Figure 5:
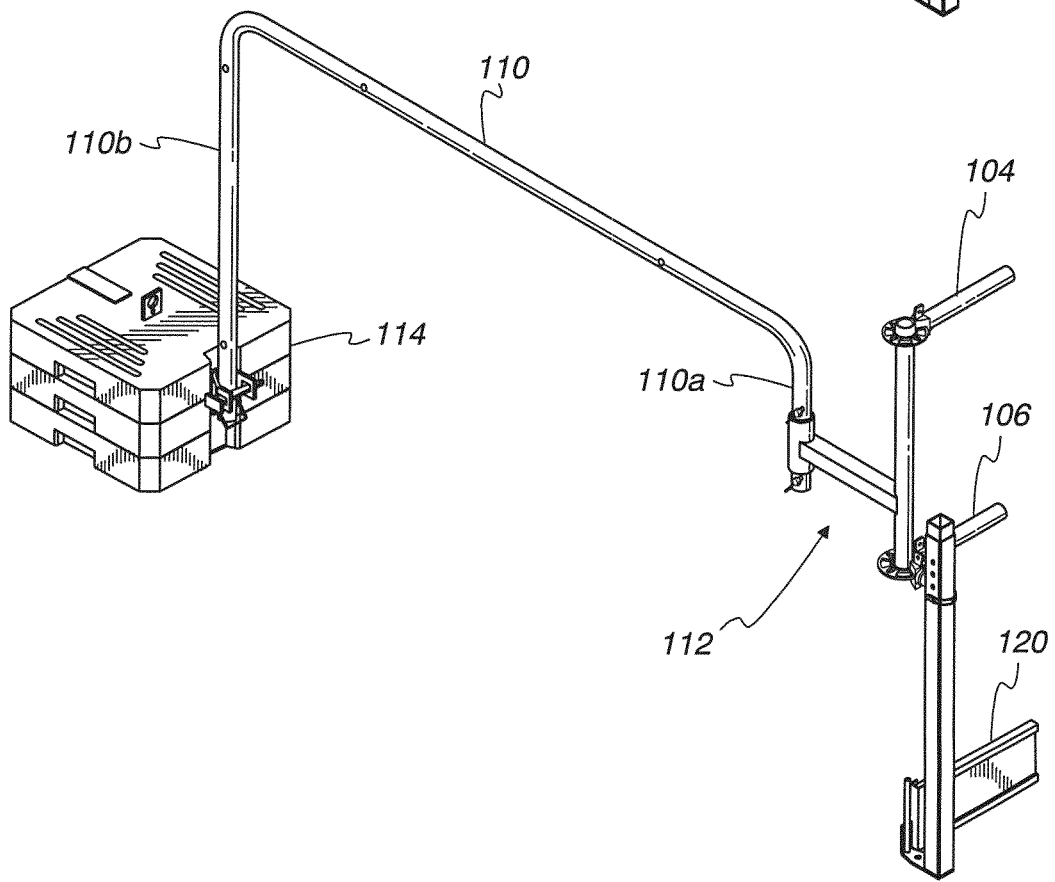
FIG. 5 is a perspective view similar to FIG. 4, but with the cantilever arm spaced from the surface as in FIGS. 3D-3G.
Figure 6:
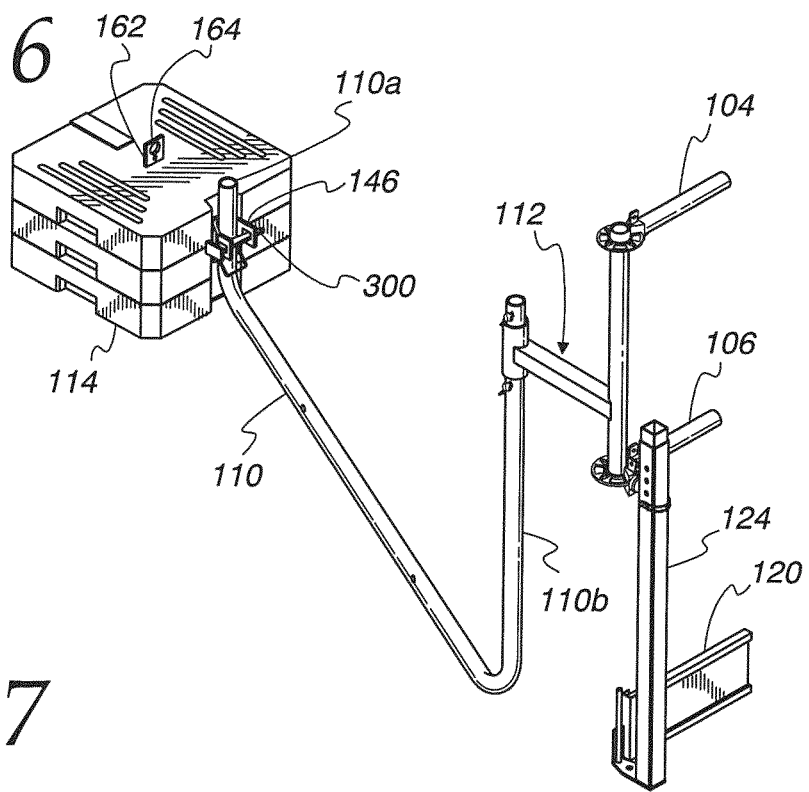
FIG. 6 is a view similar to Fig, 4, but with the cantilever arm pivoted to a position angled from the counterweight.

FIGS. 4-6 illustrate a variety of configurations of cantilever arms 110 which may be used with the edge protection system 100 disclosed herein. In FIG. 4, for example, the cantilever arm 110 is configured as illustrated in FIGS. 1-3G, wherein the horizontal portion of the arm 110 is adjacent the surface of the area with its short vertical leg 110a secured to the counterweight 114 and its long vertical leg 110b secured to the hub 112. In FIG. 5, the same arm 110 is inverted (and reversed), with the short vertical leg 110a connected to the hub 112 and the long vertical leg connected to the counterweight 114. FIG. 6 illustrates that the cantilever arm 110 may be advantageously positioned at an angle relative to the counterweight 114, thereby not only allowing installation without requiring precise positioning of the orientation of the counterweight, but also allowing such configurations when it is desired to position the cantilever arm 110 away from (and thereby allow access to) the area surface which would otherwise underlie the arm 110.

Figure 7:
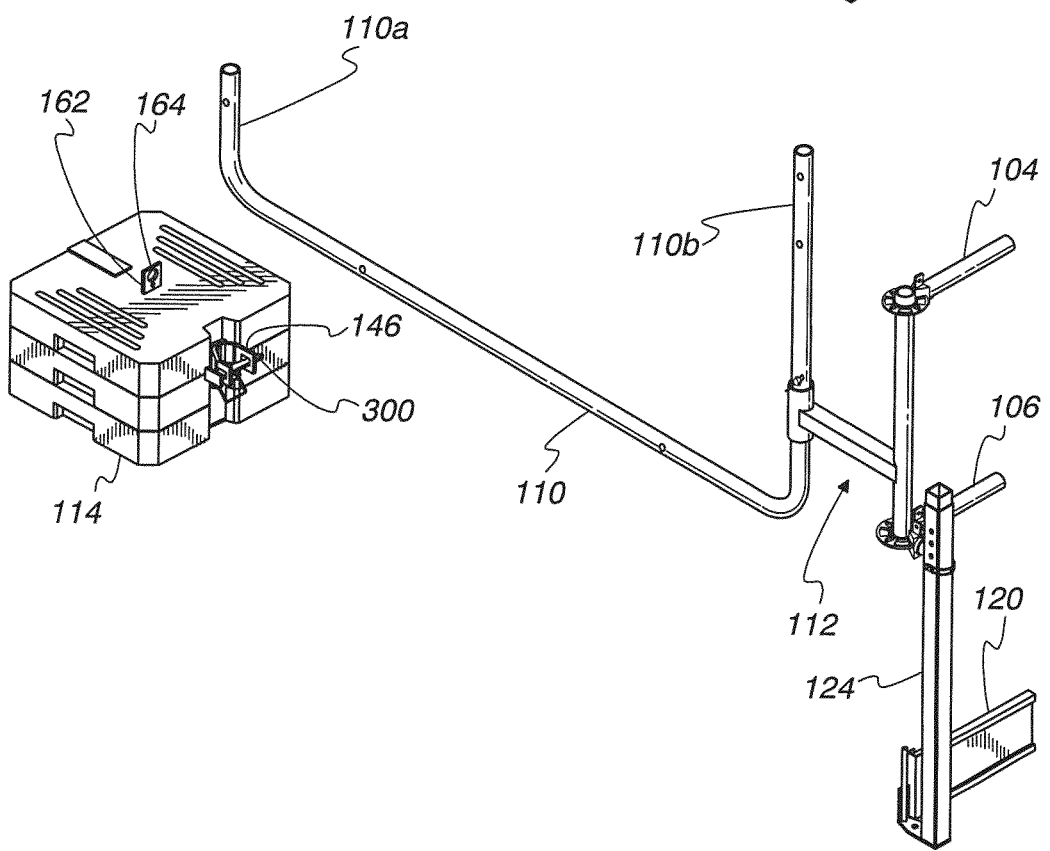
FIG. 7 is a perspective view showing the FIG. 6 structure during assembly prior to lowering the cantilever arm to connect to the counterweight bracket.
Figure 9A:
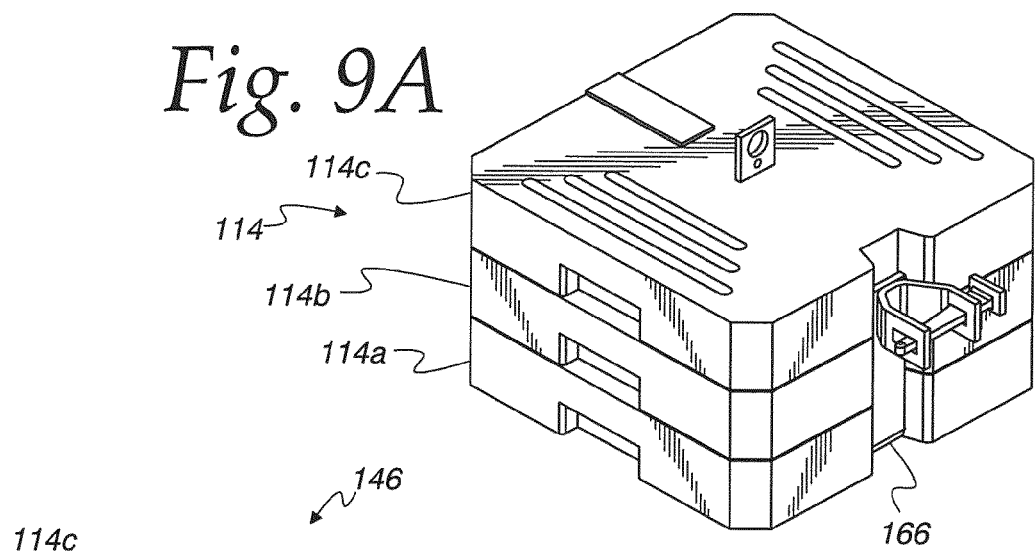
FIG. 9A is a perspective view of an assembled counterweight with weight blocks stacked on the U-shaped bracket, said counterweight being shown in orthogonal views in FIGS. 9B-9D.
Figure 9B:
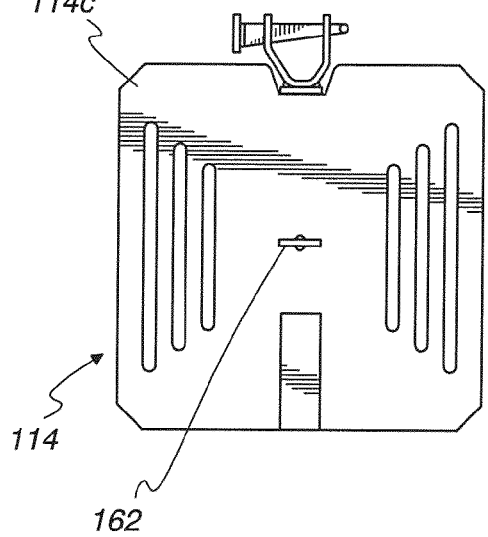
Figure 9C:
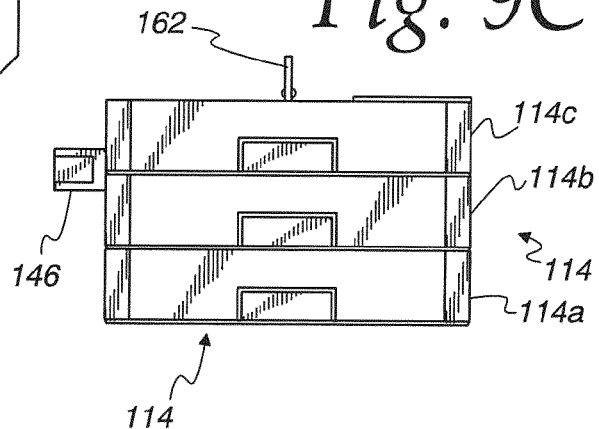
Figure 9D:
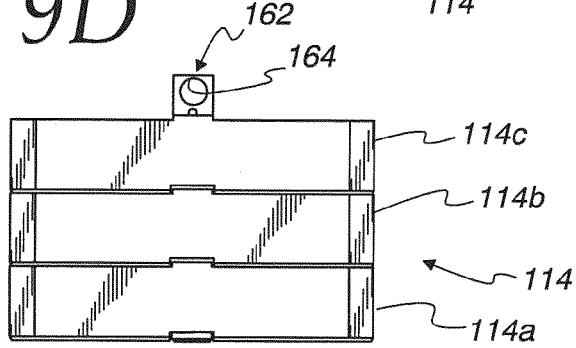

FIG. 7 illustrates assembly of the system 100 where a cantilever arm 110 is being secured to a counterweight 114 in a configuration such as illustrated in FIGS. 1, 2 and 4. The arm 110 may be moved down (with the long vertical leg 110b sliding through a sleeve 140 in the hub 112) until the short vertical leg 110a is received in the bracket 146 of the counterweight 114 as described in further detail below.

The counterweight 114 is illustrated in more detail in FIGS. 8A-D, 9A-D and 10. Specifically, the counterweight 114 may advantageously consist of a plurality of stacked weights or weight blocks 114a-c having a groove 150 on one side and an open center slot 154 therethrough. A U-shaped bracket 160 has a center leg 162 with a suitable connector 164 (e.g., opening 164) on its upper end (for securing to the trolley 130), and a second leg 166 on which the bracket 146 for the cantilever arm 110 is disposed. A selected stack of weights 114a-c are disposed over the U-shaped bracket 160 so that the center leg 162 extends through the center slots 154 of the weights 114a-c, with the second leg 166 disposed in the groove 150. It should thus be appreciated that the counterweight 114 may be configured with a desired weight by selecting the number of weights 114a-c to stack on the bracket 160. For example, each weight 114a-c may be 15 kilograms, and the counterweight 114 can be configured to weigh 15, 30 or 45 kilograms by selecting one, two or three weights 114a-c. Of course, the individual weights could be different, and variable weights 114a-c could be provided, and more or less than three weights could be used (e.g., one weight could be 20 kg, two 10 kg, and two 5 kg, allowing any weight in 5 kg increments up to 50 kg to be used).

A suitable trolley 130 which may be advantageously used to move counterweights 114 to the desired position is illustrated in FIGS. 11 and 12A-E.

The trolley 130 includes an axle 170 with a pair of wheels 174 and a handle frame 178 having a pair of handles 180. A carrying arm 184 is pivotally secured to a crossbar 186 of the handle frame 178 in a suitable manner (e.g., to brackets 188 on the crossbar 186). A connector 190 adapted to hook on to the connector 164 of a counterweight 114 is secured on the end of the carrying arm 184.

It should be appreciated that the trolley may be tipped around the axle 170 to position the connector 190 at a height whereby the trolley 130 may be rolled to move the connector 190 into engagement with the counterweight connector 164. Further, a gas strut 194 may be advantageously provided to also allow the position of the carrying arm 184 to be adjusted to a convenient height, whether to facilitate moving the trolley connector 190 into engagement with the counterweight connector 164 or to allow the handles 180 to be positioned at a comfortable height for the worker to hold as he moves the trolley 130 with a counterweight 114 connected thereto.

When the cantilever arm 110 is oriented so as to lie along or on the surface such as illustrated in FIGS. 1-2, one or more support pads 200 may be coupled to the cantilever arm 110 as illustrated in FIGS. 13-15 to distribute the weight of the edge protection system 100 over a larger area on the roof to prevent excess compression stress. The pads 200 may include a bracket 204 with a removable spring arm 206 for securing the cantilever arms 110 to the pads 200 while also allowing easy installation and removal when necessary.

It should be appreciated that, in addition to the cantilever arm orientation illustrated in FIGS. 1-2, the cantilever arm 110 may be alternatively oriented so that the arm 110 is supported above the surface to allow access to the surface therebeneath as illustrated, for example, in FIGS. 16-21. In this orientation, the cantilever arm 110 may be inverted and turned end-to-end, so that the short vertical leg 110a is secured to the hub 112 and the long vertical leg 110b is secured to the counterweight 114.

Moreover, as illustrated in FIGS. 22-23, extension posts 210 may be used with both the short and long vertical legs 110a, 110b (e.g., by a telescoping connection) to raise the cantilever arm 110 to a height sufficient to allow workers 214 to walk upright beneath the arm 110, thereby eliminating a potential tripping hazard which the cantilever arm 110 could otherwise present.

A suitable hub 112 for use in connecting the cantilever arm 110 to the ledgers 104, 106 is illustrated in detail in FIGS. 24-27E.

Figure 24:
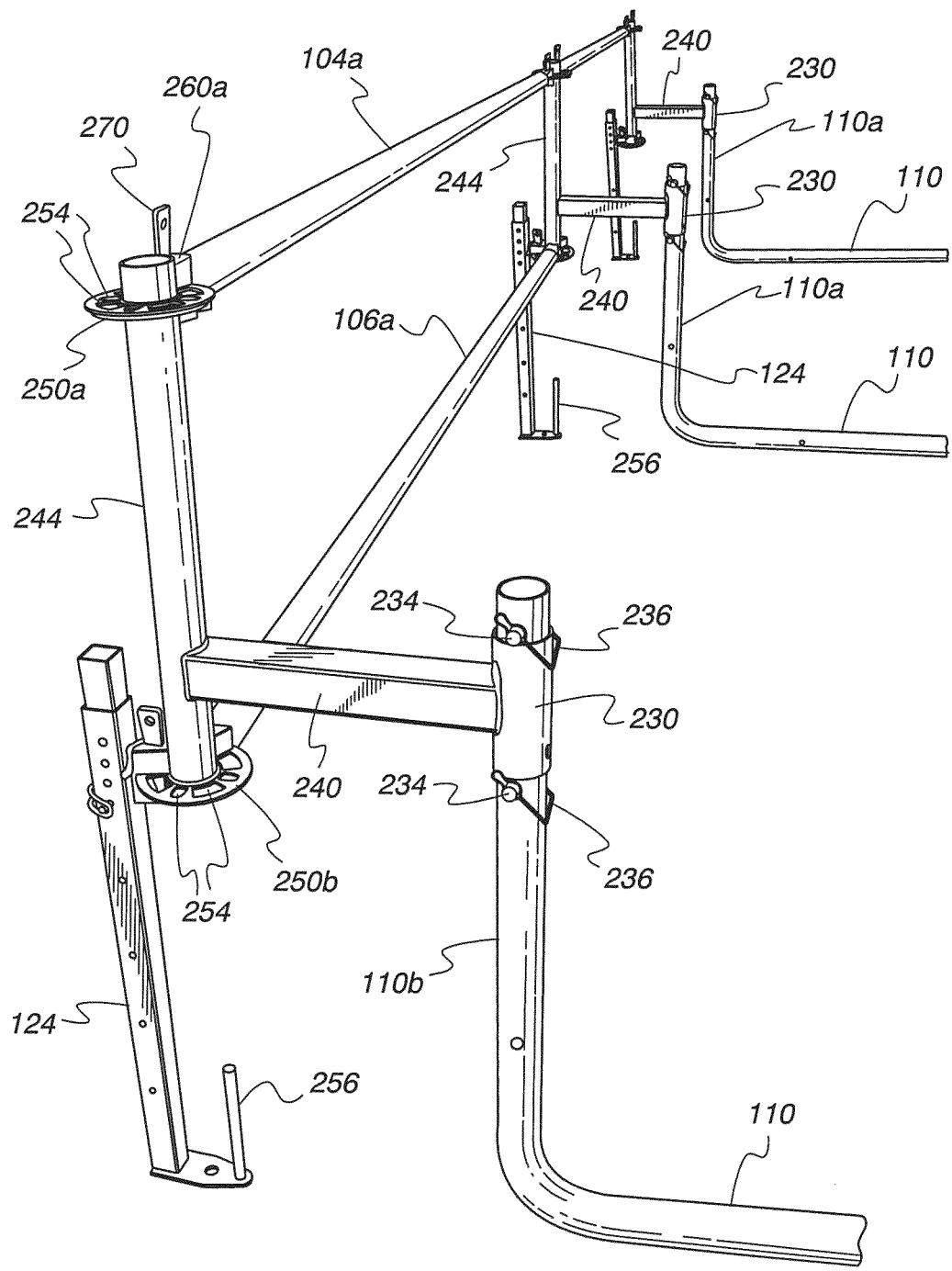
Figure 25:
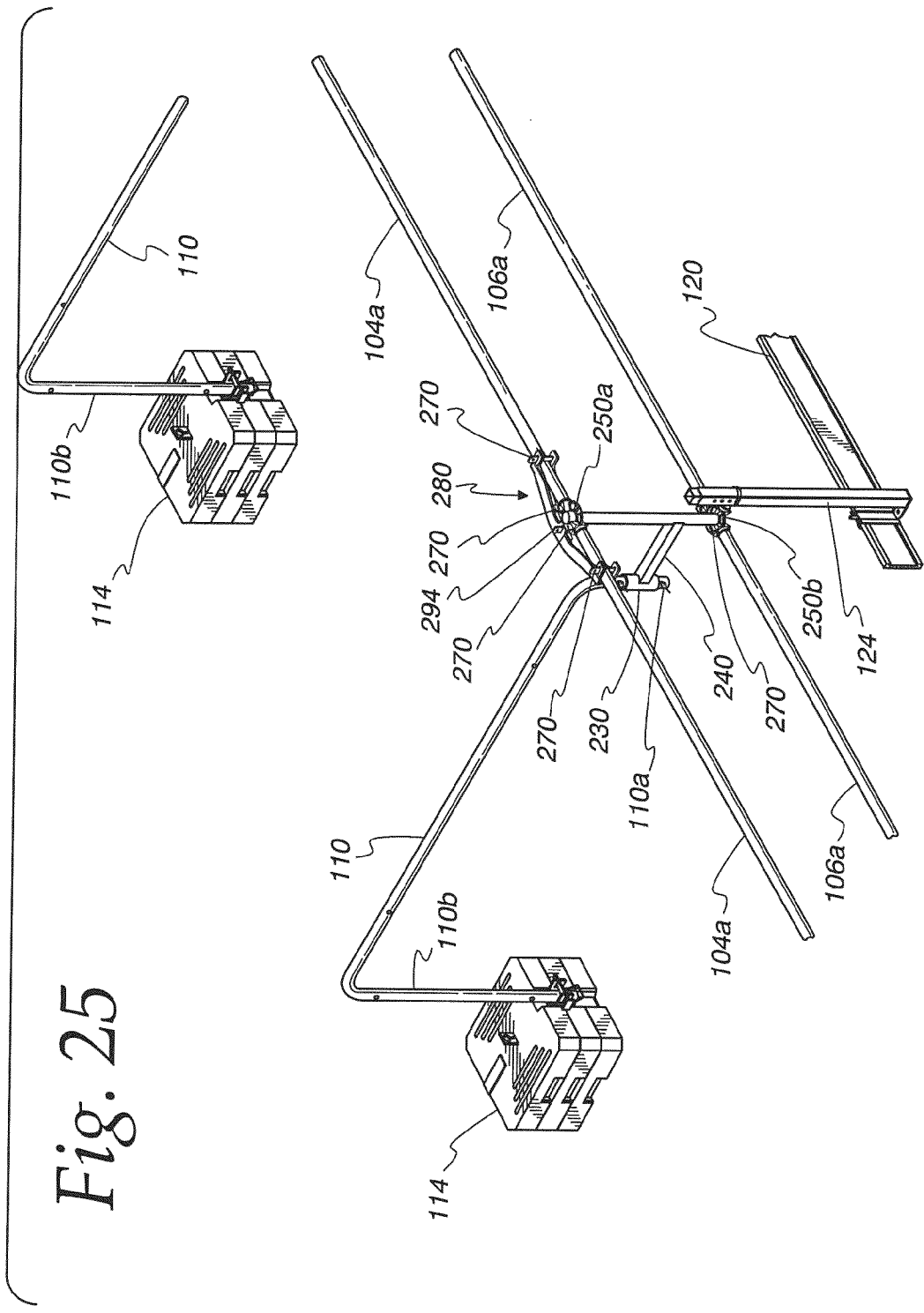
Figure 27A:
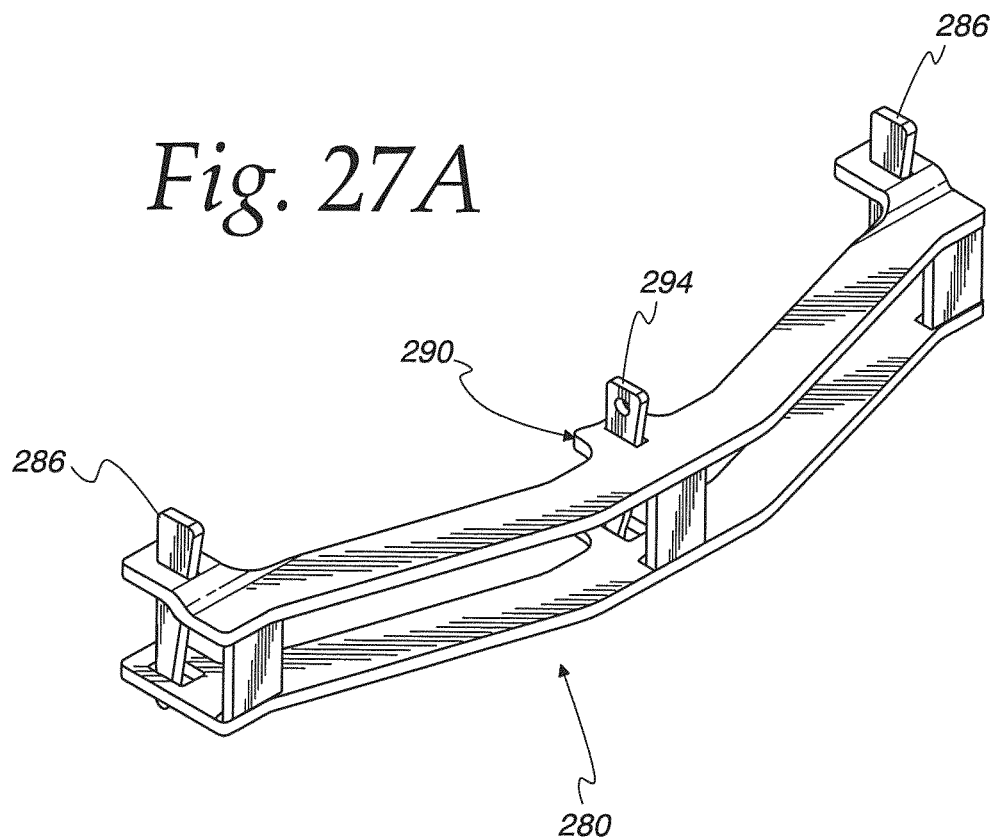
FIGS. 27A-27E illustrate a stiffener and wedges used to reinforce connected ledger sections, with FIG. 27A being a perspective view, FIGS. 27B-27D being orthogonal views, and FIG. 27E being a cross-sectional view through one end bracket of the stiffener.
Figure 27B:
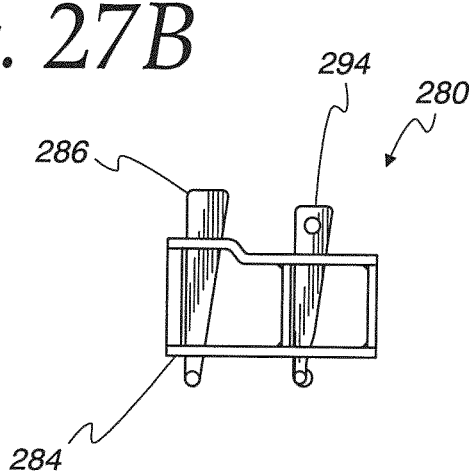
Figure 27D:
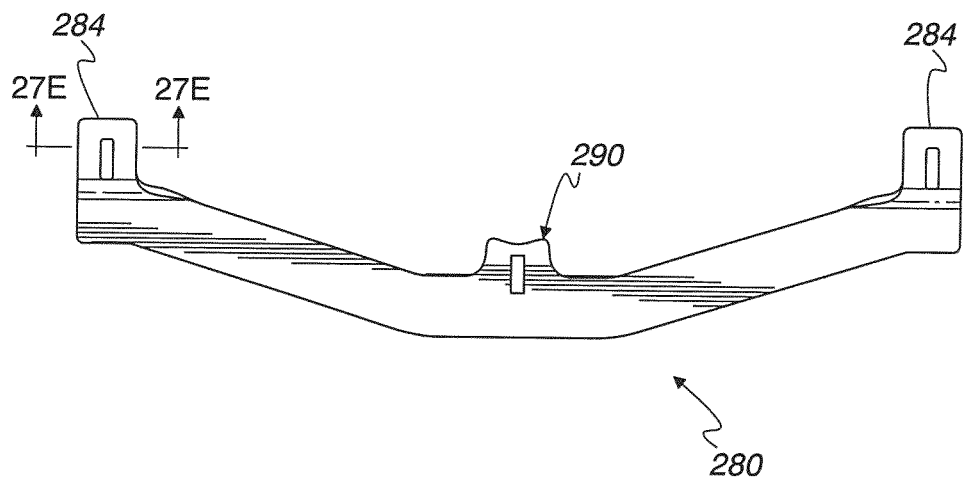
Figure 27C:
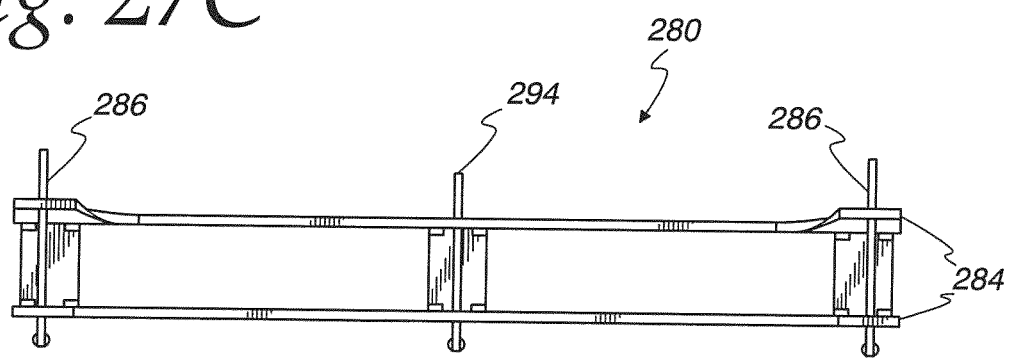
Figure 27E:
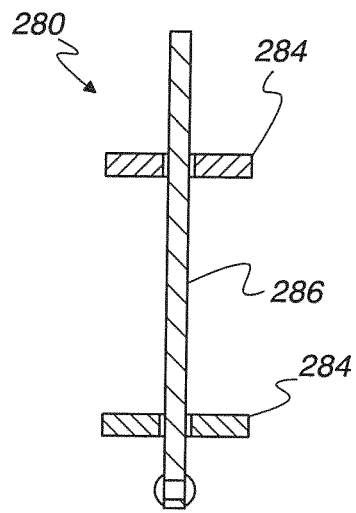

As shown in FIG. 24, the hub 112 may advantageously consist of a tubular vertical connector 230 receiving one of the vertical legs 110a or 110b of the cantilever arm 110. Pins 234 (secured by spring members 236) extending through holes in the vertical leg 110a or 110b above and below the tubular vertical connector 230 retain the vertical leg 110a or 110b at the desired height, and function whether the cantilever arm 110 is oriented so as to be adjacent the surface or spaced above it. A horizontal arm 240 connects the tubular vertical connector 230 to a vertical post 244 spaced vertically from the connector 230. Advantageously, the vertical post 244 may include a pair of vertically spaced connectors on said vertical post connecting said at least two vertically spaced ledgers to said vertical post.

Connecting wheels 250a, 250b having radially extending slots 254 are secured adjacent the top and bottom of the vertical post 244 for securing the ledgers 104, 106. Further, one of the vertical support legs 124 may be secured to the bottom connecting wheel 250b to support the system 100 in that area, as well as to provide a connection 256 at its bottom for the toe board 120 (see, e.g., FIG. 25).

The ledgers 104, 106 may advantageously be formed of a plurality of ledger sections 104a, 106a, each having connectors 260a, 260b on opposite ends for connecting to the connecting wheels 250a, 250b of adjacent hubs 112. As best illustrated in FIG. 26, connection of the ledger section end connectors 260a, 260b to the connecting wheels 250a, 250b may be advantageously accomplished by insertion of a wedge 270 through the end connector 260a, 260b of a ledger section 104a, 106a and one of the slots 254 of the wheels 250.

A stiffener 280 may also be used at the hub 112 to reinforce and stiffen the connection of adjacent ends of ledger sections 104a, 106a as best illustrated in FIGS. 26 and 27A-E. Advantageously, the stiffener 280 may be U-shaped (see FIGS. 27B and 27C) to define brackets 284 on either end, with the ledger sections 104a, 106a being received in the brackets 284 and secured therein by wedges 286. Additionally, the stiffener 280 may include a connector 290 between the ends adapted to be secured to the connecting wheel 250 by similarly inserting a wedge 294 through the stiffener connector 290 and a connecting wheel slot 254.

It should be appreciated that while the stiffener 280 as illustrated in the Figures may be used to strengthen and stiffen adjacent ledger sections 104a or 106a in a linear configuration, adjacent ledger sections 104a or 106a could also be secured to different connecting wheel slots 254 so as to be oriented at an angle relative to each other, with a similar but differently shaped stiffener used to strengthen and stiffen those ledger sections 104a or 106a in such an angled configuration.

Figure 10:
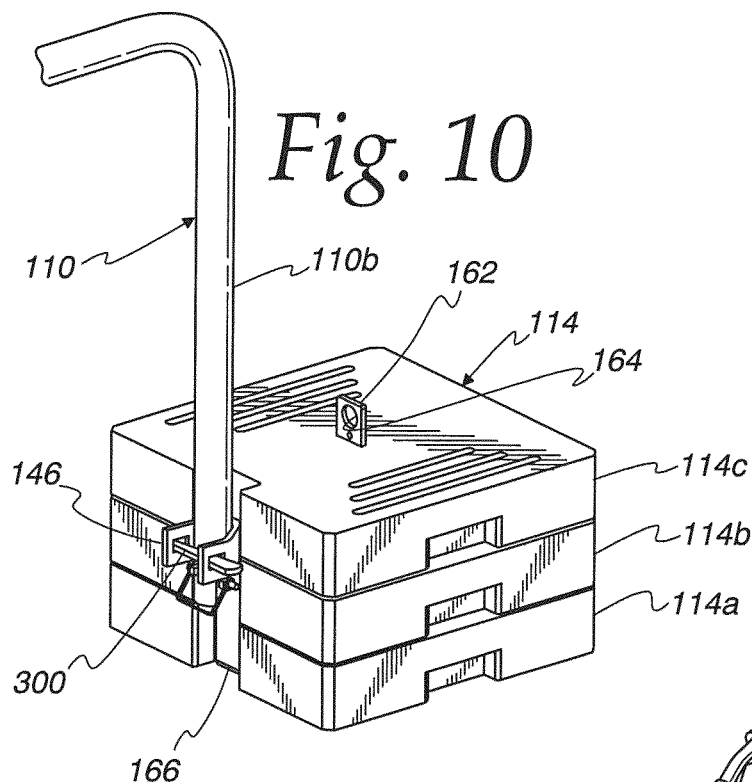
FIG. 10 is a perspective view of an assembled counterweight secured to a cantilever arm spaced from the surface as illustrated in FIGS. 3D-3G and 5.

Still further, it should be appreciated that connections secured by use of wedges 270, 286, 294 may advantageously used in other connections (e.g., see wedge 300 for securing the connection of the counterweight bracket 160 to the counterweight vertical leg 110a or 110b, as illustrated in FIG. 10). Additionally, assembly may be readily and quickly accomplished by use of such wedges by simply hammering them into place and, during disassembly, may be similarly quickly removed by hammering the narrow end of the wedges to remove them.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

The invention claimed is:

1. An edge protection system for protecting workers pursuant to protection codes, regulations, or prudent safe concerns, comprising;
   a plurality of spaced counterweights each having a connecting bracket on one side thereof;
   a plurality of cantilever arms, each of said arms having a first vertical leg on one end, each of said first vertical legs being pivotably secured to one of said connecting brackets for pivoting about a vertical axis of said leg; and
   a plurality of ledgers having opposite ends;
   a plurality of hubs, each of said hubs secured to the other end of one of said cantilever arms and including a connector with slots therein connected to one end of each of two ledgers;
   a stiffener connected to at least one of said two ledgers and connected to one of said hub connectors by a wedge through a selected one of said slots; and
   second vertical legs on the other end of the cantilever arms, said hubs being secured to said second vertical legs, wherein said first and second vertical legs support the cantilever arm at a height sufficient to allow protected workers to walk upright beneath said arm.

2. The edge protection system of claim 1, wherein said hubs each comprise:
   a vertical connector receiving one of said second vertical legs of one of the cantilever arms;
   a horizontal arm connecting a vertical post to said huh vertical connector; and
   first and second vertically spaced connectors on said vertical post connecting said at least two vertically spaced ledgers to said vertical post.

3. An edge protection system, comprising:
   a plurality of spaced counterweights each having a connecting bracket on one side thereof;
   a plurality of cantilever arms, each of said arms having a first vertical leg on one end, each of said first vertical legs being pivotably secured to one of said connecting brackets for pivoting about a vertical axis of said leg;
   a plurality of hubs, each of said hubs secured to the other end of one of said cantilever arms; and
   a plurality of ledgers wherein at least two ledgers are secured to and between adjacent hubs,
   wherein said counterweights comprise:
      a U-shaped bracket having two upright legs, one of said upright legs having a connector on its upper end and the other of said upright legs having one of said connecting brackets; and
      a plurality of weight blocks each having a vertical center opening therethrough and a slot on one side;
      wherein a selected number of said blocks are stacked on said bracket with said bracket one upright leg extending through said center openings and said other upright leg in said slot.

4. The edge protection system of claim 3, further comprising a trolley having an axle with a pair of wheels and a carrying connector adapted to selectively connect to said U-shaped bracket connector, whereby said trolley may pivoted around said axle to lift a connected counterweight and then rolled to transport said counterweight to a selected location.

5. An edge protection system, comprising:
a plurality of spaced counterweights each having a connecting bracket on one side thereof;
a plurality of cantilever arms, each of said arms having a first vertical leg on one end, each of said first vertical legs being pivotably secured to one of said connecting brackets for pivoting about a vertical axis of said leg;
a plurality of hubs, each of said hubs secured to the other end of one of said cantilever arms; and
a plurality of ledgers wherein at least two ledgers are secured to and between adjacent hubs, wherein:
 said ledgers include first and second ledger sections having connectors on their ends; and
 each of said hubs comprises
  a vertical post;
  a first stiffener having brackets on opposite ends connected to first and second ledger sections of a first ledger; and
  a first connecting wheel on said vertical post, said first connecting wheel having radially extending slots therein;
 wherein:
  the first and second ledger sections of the first ledger are secured at a selected orientation by wedges through the ledger section connectors and selected slots in said first connecting wheel; and
  said first stiffener is secured to said first connecting wheel by a wedge extending through said first stiffener and another selected slot in said first connecting wheel.

6. The hub of claim 5, each of said hubs further comprising:
a second stiffener having brackets on opposite ends connected to first and second ledger sections of a second ledger; and
a second connecting wheel vertically spaced from said first connecting wheel on said vertical post, said second connecting wheel having radially extending slots therein;
wherein:
 first and second ledger sections of a second ledger are secured at a selected orientation by wedges through the ledger section connectors and selected slots in said second connecting wheel; and
 said second stiffener is secured to said second connecting wheel by a wedge extending through said second stiffener and another selected slot in said second connecting wheel.

7. An edge protection system for protecting workers pursuant to protection codes, regulations, or prudent safety concerns, comprising:
a plurality of spaced counterweights each having a connecting bracket on one side thereof;
a plurality of cantilever arms, each of said arms having a first vertical leg on one end and a second vertical leg on the other end, wherein said first and second vertical legs support the cantilever arm at a height sufficient to allow workers to walk upright beneath said arm; and
a plurality of ledgers having opposite ends;
a plurality of hubs, each of said hubs secured to the other end of one of said cantilever arms and including a connector with slots therein connected to one end of each of two ledgers; and
a stiffener connected to at least one of said two ledgers and connected to one of said hub connectors by a wedge through a selected one of said slots.

8. An edge protection system, comprising:
a plurality of spaced counterweights each having a connecting bracket on one side thereof;
a plurality of cantilever arms, each of said arms having a first vertical leg on one end and a second vertical leg on the other end, wherein said first and second vertical legs support the cantilever arm at a height sufficient to allow workers to walk upright beneath said arm;
a plurality of hubs, each of said hubs secured to the second leg on the other end of one of said cantilever arms; and
a plurality of ledgers wherein at least two ledgers are secured to and between adjacent hubs;
wherein said counterweights comprise:
 a U-shaped bracket having two upright legs, one of said upright legs having a connector on its upper end and the other of said upright legs having one of said connecting brackets; and
 a plurality of weight blocks each having a vertical center opening therethrough and a slot on one side;
 wherein a selected number of said blocks are stacked on said bracket with said bracket one upright leg extending through said center openings and said other upright leg in said slot.

9. The edge protection system of claim 8, further comprising a trolley having an axle with a pair of wheels and a carrying connector adapted to selectively connect to said U-shaped bracket connector, whereby said trolley may pivoted around said axle to lift a connected counterweight and then rolled to transport said counterweight to a selected location.

10. The edge protection system of claim 8, further comprising second vertical legs on the other end of the cantilever arms, wherein said hubs each comprise:
A vertical connector receiving one of said second vertical legs of one of the cantilever arms;
a horizontal arm connecting a vertical post to said hub vertical connector; and
first and second vertically spaced connectors on said vertical post connecting said at least two vertically spaced ledgers to said vertical post.

11. An edge protection system, comprising:
a plurality of spaced counterweights each having a connecting bracket on one side thereof;
a plurality of cantilever arms, each of said arms having a first vertical leg on one end and a second vertical leg on the other end, wherein said first and second vertical legs support the cantilever arm at a height sufficient to allow workers to walk upright beneath said arm;
a plurality of hubs, each of said hubs secured to the second leg on the other end of one of said cantilever arms; and
a plurality of ledgers wherein at least two ledgers are secured to and between adjacent hubs;
wherein:
 said ledgers include first and second ledger sections having connectors on their ends; and
 each of said hubs comprises
  a vertical post;
  a first stiffener having brackets on opposite ends connected to first and second ledger sections of a first ledger; and
  a first connecting wheel on said vertical post, said first connecting wheel having radially extending slots therein;
 wherein:
  the first and second ledger sections of the first ledger are secured at a selected orientation by wedges through the ledger section connectors and selected slots in said first connecting wheel; and said first stiffener is secured to said first connecting wheel by a wedge extending through said first stiffener and another selected slot in said first connecting wheel.

12. The edge protection system of claim 11, each of said hubs further comprising:
  a second stiffener having brackets on opposite ends connected to first and second ledger sections of a second ledger; and
  a second connecting wheel vertically spaced from said first connecting wheel on said vertical post, said second connecting wheel having radially extending slots therein;
  wherein:
    first and second ledger sections of a second ledger are secured at a selected orientation by wedges through the ledger section connectors and selected slots in said second connecting wheel; and
    said second stiffener is secured to said second connecting wheel by a wedge extending through said second stiffener and another selected slot in said second connecting wheel.

\* \* \* \* \*